US010785706B2

(12) United States Patent
Verma et al.

(10) Patent No.: US 10,785,706 B2
(45) Date of Patent: Sep. 22, 2020

(54) BANDWIDTH SIGNALING FOR A BASIC SERVICE SET (BSS) SUPPORTING 320 MHZ OPERATING BANDWIDTH

(71) Applicant: QUALCOMM Incorporated, San Diego, CA (US)

(72) Inventors: Lochan Verma, San Diego, CA (US); Bin Tian, San Diego, CA (US); Sameer Vermani, San Diego, CA (US); Lin Yang, San Diego, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 16/159,313

(22) Filed: Oct. 12, 2018

(65) Prior Publication Data

US 2019/0116545 A1    Apr. 18, 2019

Related U.S. Application Data

(60) Provisional application No. 62/573,118, filed on Oct. 16, 2017.

(51) Int. Cl.
| | | |
|---|---|---|
| *H04W 4/00* | (2018.01) | |
| *H04W 48/10* | (2009.01) | |
| *H04W 8/00* | (2009.01) | |
| *H04W 8/24* | (2009.01) | |
| *H04W 72/04* | (2009.01) | |
| *H04W 48/20* | (2009.01) | |
| *H04W 48/08* | (2009.01) | |
| *H04W 84/12* | (2009.01) | |

(52) U.S. Cl.
CPC ........... *H04W 48/10* (2013.01); *H04W 8/005* (2013.01); *H04W 8/24* (2013.01); *H04W 48/08* (2013.01); *H04W 48/20* (2013.01); *H04W 72/0446* (2013.01); *H04W 72/0453* (2013.01); *H04W 84/12* (2013.01)

(58) Field of Classification Search
CPC ..... H04W 48/10; H04W 48/08; H04W 48/20; H04W 72/0446; H04W 8/24; H04W 8/005; H04W 72/0453; H04W 84/12
See application file for complete search history.

(56) References Cited

U.S. PATENT DOCUMENTS

| | | | | |
|---|---|---|---|---|
| 10,148,412 | B1 * | 12/2018 | Chu | ........................ H04L 69/28 |
| 10,153,857 | B1 * | 12/2018 | Chu | ................... H04W 72/0453 |
| 2012/0026997 | A1 | 2/2012 | Seok et al. | |
| 2013/0136016 | A1 | 5/2013 | Lee et al. | |

(Continued)

OTHER PUBLICATIONS

"PCT Application No. PCT/US2018/055914 International Search Report and Written Opinion", dated Jan. 2, 2019, 17 pages.

*Primary Examiner* — Maharishi V Khirodhar
(74) *Attorney, Agent, or Firm* — Qualcomm Inc (DL)

(57) ABSTRACT

Systems, devices, apparatus and methods, including computer programs encoded on storage media, are disclosed for an access point (AP) in a basic service set (BSS) to advertise or indicate 320 MHz bandwidth operation and frequency segment composition in the 320 MHz bandwidth to one or more stations (STAs) in a Wireless Local Area Network (WLAN). Also, a WLAN device may advertise or indicate its 320 MHz bandwidth support capability to other WLAN devices in the WLAN.

23 Claims, 10 Drawing Sheets

(56) References Cited

U.S. PATENT DOCUMENTS

| | | | |
|---|---|---|---|
| 2013/0265907 A1* | 10/2013 | Kim | H04L 5/0064 |
| | | | 370/254 |
| 2016/0088126 A1* | 3/2016 | Doan | H04L 27/261 |
| | | | 370/329 |
| 2017/0034317 A1* | 2/2017 | Kenney | H04L 27/2626 |
| 2017/0171796 A1* | 6/2017 | Wu | H04W 48/16 |
| 2018/0027514 A1* | 1/2018 | Chen | H04L 27/2601 |
| | | | 370/338 |

* cited by examiner

| EHT OPERATION IE 625 | |
|---|---|
| OPERATION BANDWIDTH FIELD 655 | DEFINITION |
| CHANNEL NUMBER | CHANNEL NUMBER OF THE PRIMARY CHANNEL |
| CHANNEL WIDTH (BANDWIDTH) | 20/40/80/160/80+80/320/4X80/160+160/2X80+160 |
| SEGMENT 0 CHANNEL CENTER FREQUENCY | *FOR 20/40/80/160/320 MHZ BSS BANDWIDTH, THIS SUBFIELD INDICATES THE CHANNEL CENTER FREQUENCY INDEX (CCFI) OF THE 20/40/80/160/320 MHZ CHANNEL ON WHICH THE BSS OPERATES<br>*FOR 80+80 MHZ, THIS SUBFIELD INDICATES THE CCFI OF THE LOWEST 80 MHZ CHANNEL SEGMENT<br>*FOR 160+160 MHZ, THIS SUBFIELD INDICATES THE CCFI OF THE LOWEST 160 MHZ CHANNEL SEGMENT<br>*FOR 4X80 MHZ, THIS SUBFIELD INDICATES THE CCFI OF THE LOWEST 80 MHZ CHANNEL SEGMENT OUT OF 4X80 MHZ SEGMENTS ARRANGED IN INCREASING ORDER OF FREQUENCY<br>*FOR 2X80+160 MHZ, THIS SUBFIELD INDICATES THE CCFI OF THE LOWEST 80 MHZ CHANNEL SEGMENT, OUT OF 2X80+160 MHZ |
| SEGMENT 1 CHANNEL CENTER FREQUENCY | *FOR 20/40/80/160/320 MHZ BSS BANDWIDTH, THIS SUBFIELD IS SET TO 0<br>*FOR 80+80 MHZ, THIS SUBFIELD INDICATES THE CCFI OF THE HIGHEST 80 MHZ CHANNEL SEGMENT<br>*FOR 160+160 MHZ, THIS SUBFIELD INDICATES THE CCFI OF THE HIGHEST 160 MHZ CHANNEL SEGMENT<br>*FOR 4X80 MHZ, THIS SUBFIELD INDICATES THE CCFI OF THE SECOND 80 MHZ CHANNEL SEGMENT OUT OF 4X80 MHZ SEGMENTS ARRANGED IN INCREASING ORDER OF FREQUENCY<br>*FOR 2X80+160 MHZ, INDICATES THE CCFI OF THE HIGHEST 80 MHZ CHANNEL SEGMENT, OUT OF 2X80+160 MHZ |
| SEGMENT 2 CHANNEL CENTER FREQUENCY | *FOR 20/40/80/160/320 MHZ BSS BANDWIDTH, THIS SUBFIELD IS SET TO 0<br>*FOR 4X80 MHZ, THIS SUBFIELD INDICATES THE CCFI OF THE THIRD 80 MHZ CHANNEL SEGMENT OUT OF 4X80 MHZ SEGMENTS ARRANGED IN INCREASING ORDER OF FREQUENCY<br>*FOR 2X80+160 MHZ, INDICATES THE CCFI OF THE 160 MHZ CHANNEL SEGMENT, OUT OF 2X80+160 MHZ |
| SEGMENT 3 CHANNEL CENTER FREQUENCY | *FOR 20/40/80/160/320 MHZ BSS BANDWIDTH, THIS SUBFIELD IS SET TO 0<br>*FOR 4X80 MHZ, THIS SUBFIELD INDICATES THE CCFI OF THE FOURTH 80 MHZ CHANNEL SEGMENT OUT OF 4X80 MHZ SEGMENTS ARRANGED IN INCREASING ORDER OF FREQUENCY |

FIG. 6 ed in this Patent
Application.

BANDWIDTH SIGNALING FOR A BASIC SERVICE SET (BSS) SUPPORTING 320 MHZ OPERATING BANDWIDTH

CROSS-REFERENCE TO RELATED APPLICATIONS

This Patent Application claims priority to U.S. Provisional Patent Application No. 62/573,118, filed Oct. 16, 2017. The disclosure of the prior Application is considered part of and is incorporated by reference in this Patent Application.

TECHNICAL FIELD

This disclosure relates to wireless communications, and more specifically, to wireless local area networks (WLANs).

DESCRIPTION OF THE RELATED TECHNOLOGY

A wireless local area network (WLAN) may be formed by one or more access points (APs) that provide a shared wireless communication medium for use by a number of client devices, also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a service set identifier (SSID) that is advertised by the AP. An AP periodically broadcasts beacon frames to enable any STAs within wireless range of the AP to establish or maintain a communication link with the WLAN. In a typical WLAN, each STA may be associated with only one AP at a time. To identify an AP with which to associate, a STA is configured to perform scans on the wireless channels of each of one or more frequency bands (for example, the 2.4 GHz band and the 5 GHz band). As a result of the increasing ubiquity of wireless networks, a STA may have the opportunity to select one of many WLANs within range of the STA or select among multiple APs that together form an extended BSS. After association with an AP, a STA also may be configured to periodically scan its surroundings to find a more suitable AP with which to associate. For example, a STA that is moving relative to its associated AP may perform a "roaming" scan to find an AP having more desirable network characteristics, such as a greater received signal strength indicator (RSSI).

Wireless communications systems are widely deployed to provide various types of communication content such as voice, video, packet data, messaging, broadcast, and so on. These systems may be multiple-access systems capable of supporting communication with multiple users by sharing the available system resources (for example, time, frequency, and space). The AP may be coupled to a network, such as the Internet, and may enable a STA to communicate via the network including communicating with other devices coupled to the AP.

SUMMARY

The systems, methods and devices of this disclosure each have several innovative aspects, no single one of which is solely responsible for the desirable attributes disclosed herein.

One innovative aspect of the subject matter described in this disclosure can be implemented by an access point (AP). The AP may determine to advertise a 320 MHz operating bandwidth for a basic service set (BSS) associated with the AP. The AP may select a frequency segment composition for the 320 MHz operating bandwidth from a plurality of frequency segment compositions associated with the 320 MHz operating bandwidth. The AP may prepare a management frame for transmission to at least one station (STA) of a wireless local area network (WLAN). The management frame may indicate the 320 MHz operating bandwidth associated with the BSS and the frequency segment composition for the 320 MHz operating bandwidth.

In some implementations, the AP may determine a center frequency of each segment associated with the frequency segment composition for the 320 MHz operating bandwidth. The management frame may further indicate the center frequency of each segment associated with the frequency segment composition for the 320 MHz operating bandwidth.

In some implementations, the AP may transmit the management frame to the at least one STA of the BSS. The management frame may indicate the 320 MHz operating bandwidth, the frequency segment composition for the 320 MHz operating bandwidth, and the center frequency of each segment associated with the frequency segment composition for the 320 MHz operating bandwidth.

In some implementations, the management frame may include an extremely high throughput (EHT) Operation Information Element (IE). The EHT Operation IE may indicate the 320 MHz operating bandwidth, the frequency segment composition for the 320 MHz operating bandwidth, and the center frequency of each segment associated with the frequency segment composition for the 320 MHz operating bandwidth.

In some implementations, an Operation Bandwidth field of the EHT Operation IE further includes a primary channel number of a primary channel of the BSS, and a channel width for providing a composition of the 320 MHz operating bandwidth and a number of frequency segments.

In some implementations, the Operation Bandwidth field of the EHT Operation IE further includes a first segment channel center frequency, a second segment channel center frequency, a third segment channel center frequency, and a fourth segment channel center frequency for indicating the center frequency of each segment associated with the frequency segment composition for the 320 MHz operating bandwidth.

In some implementations, the AP may receive bandwidth capabilities information from STAs of the BSS. The bandwidth capabilities information may indicate an operating bandwidth and one or more frequency segment compositions that are supported by each of the STAs of the BSS. The AP may determine to advertise the 320 MHz operating bandwidth for the BSS in response to determining at least one of the STAs supports the 320 MHz operating bandwidth.

In some implementations, the AP may receive bandwidth capabilities information from STAs of the BSS. The bandwidth capabilities information may indicate an operating bandwidth and one or more frequency segment compositions that are supported by each of the STAs of the BSS. The AP may select the frequency segment composition for the 320 MHz operating bandwidth from the plurality of frequency segment compositions associated with the 320 MHz operating bandwidth based, at least in part, on the one or more frequency segment compositions that are supported by each of the STAs of the BSS.

In some implementations, the AP may determine one or more STAs of the BSS are EHT devices and one or more STAs of the BSS are non-EHT devices. The AP may prepare the management frame for transmission. The management frame may include an EHT Operation IE indicating the 320 MHz operating bandwidth, the frequency segment composition, and a center frequency of each segment associated with the frequency segment composition for the EHT devices. The management frame also may include a non-EHT Operation IE indicating the operating bandwidth and a corresponding frequency segment composition for the non-EHT devices.

In some implementations, the frequency segment composition selected for the BSS is one of the plurality of frequency segment compositions associated with the 320 MHz operating bandwidth. The plurality of frequency segment compositions associated with the 320 MHz operating bandwidth may include a single 320 MHz frequency segment, two 160 MHz frequency segments, four 80 MHz frequency segments, and one 160 MHz frequency segment and two 80 MHz frequency segments.

Another innovative aspect of the subject matter described in this disclosure can be implemented by a WLAN device. The WLAN device may determine support for a 320 MHz operating bandwidth. The WLAN device may determine one or more frequency segment compositions that are supported by the WLAN device from a plurality of frequency segment compositions associated with the 320 MHz operating bandwidth. The WLAN device may prepare a management frame for transmission to at least one other WLAN device of a WLAN. The management frame may indicate support for the 320 MHz operating bandwidth and support for the one or more frequency segment compositions for the 320 MHz operating bandwidth.

In some implementations, the management frame includes an extremely high throughput (EHT) Capabilities Information Element (IE). The EHT Capabilities IE may include an indication of whether the WLAN device supports the 320 MHz operating bandwidth, and an indication of the one or more frequency segment compositions that are supported by the WLAN device.

In some implementations, the WLAN device may receive operating bandwidth information from an AP associated with a basic service set (BSS). The operating bandwidth information may indicate the 320 MHz operating bandwidth for the BSS associated with the AP, a frequency segment composition for the BSS, and a center frequency of each segment associated with the frequency segment composition associated with the BSS. The WLAN device may join the BSS associated with the AP. The WLAN device may prepare a packet for transmission in a channel of the BSS using the 320 MHz operating bandwidth and the frequency segment composition. The packet may include an indication of the 320 MHz operating bandwidth.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 6 depicts an example EHT Operation IE for EHT 320 MHz bandwidth signaling.

Like reference numbers and designations in the various drawings indicate like elements.

DETAILED DESCRIPTION

Figure 1:
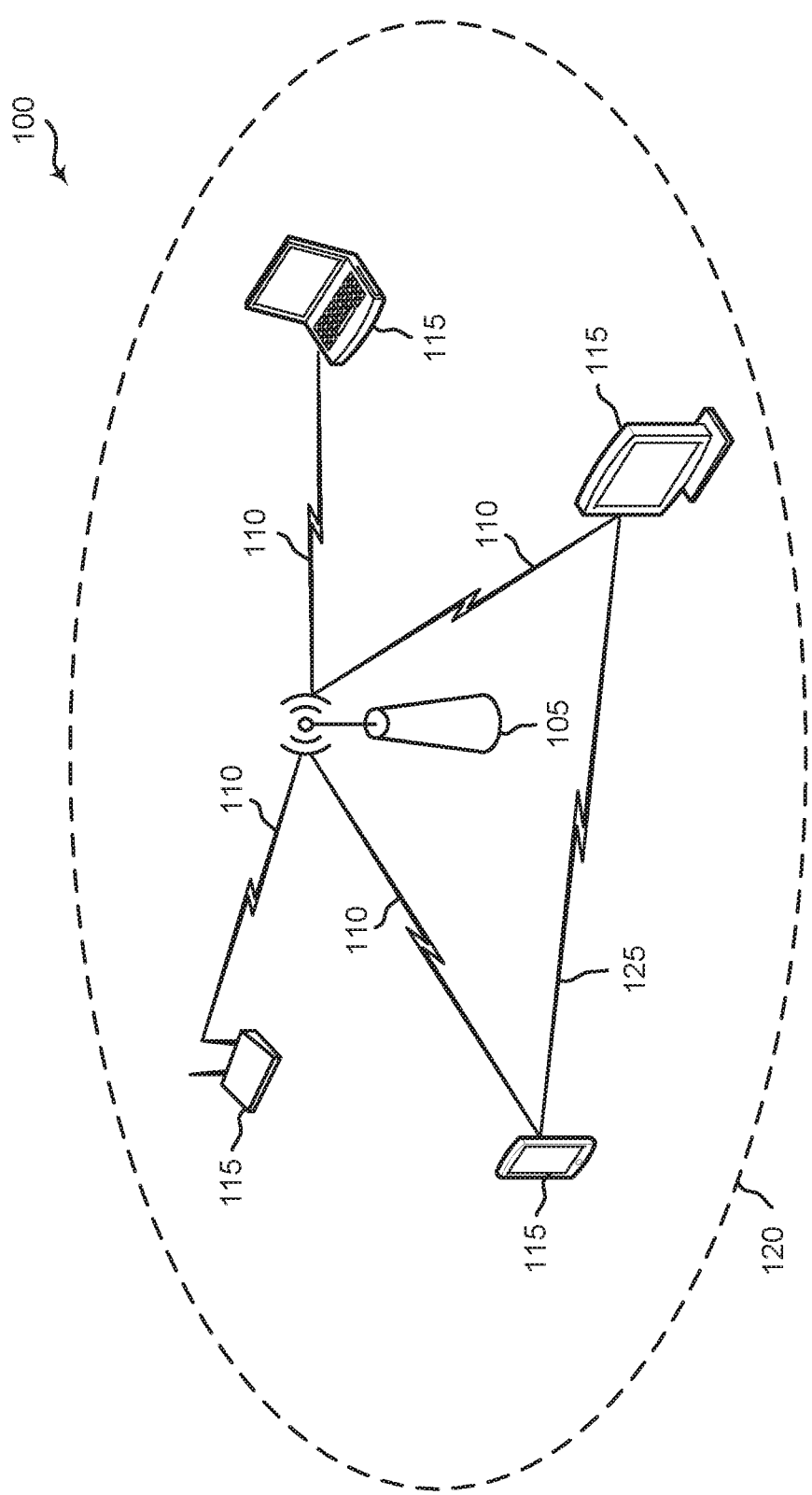
FIG. 1 depicts a system diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to any of the Institute of Electrical and Electronics Engineers (IEEE) 802.11 standards, or the Bluetooth® standards. The described implementations also can be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In a wireless local area network (WLAN) that includes an access point (AP) and one or more stations (STAs), the AP can advertise the operating channel and bandwidth for a Basic Service Set (BSS) to the one or more STAs. For example, the AP may transmit a management frame, such as a Beacon Frame or a Probe Response Frame, to indicate the operating channel and bandwidth for the BSS. The management frame also may indicate a frequency segment composition associated with the operating bandwidth and the corresponding center frequency of each segment.

In some implementations, the AP and at least one of the STAs may support a 320 MHz operating bandwidth for the channel of the BSS. The operating bandwidth also may be referred to as a channel width or channel bandwidth. APs and STAs that support a 320 MHz operating bandwidth may be referred to as Extremely High Throughput (EHT) devices. EHT devices may support a 320 MHz operating bandwidth in addition to the operating bandwidths supported by non-EHT (or legacy) devices, such as 20/40/80/160 MHz operating bandwidths. EHT devices also may support one or more frequency segment compositions from the frequency segment compositions that are available for the 320 MHz operating bandwidth. In some implementations, four frequency segment compositions may be available for the 320 MHz operating bandwidth, which include (1) a single 320 MHz frequency segment, (2) two 160 MHz (160+160 MHz) frequency segments (contiguous or non-contiguous), (3) four 80 MHz (4×80 MHz) frequency segments (contiguous or non-contiguous), and (4) one 160 MHz and two 80 MHz (160+2×80 MHz) frequency segments (contiguous or non-contiguous). The generations of WLAN devices prior to EHT devices (such as IEEE 802.11ax devices) typically support a maximum channel bandwidth of 160 MHz. Besides using a larger channel bandwidth of 320 MHz, EHT devices also may utilize higher modulations (such as 4 k-QAM/16 k-QAM), and utilize a larger number of spatial streams, such as a maximum of 16 spatial streams. The generations of WLAN devices prior to EHT devices typically utilize a maximum modulation of 1024-QAM, and operate with at most 8 spatial streams.

In some implementations, the AP may advertise the 320 MHz operating bandwidth of the BSS to the one or more STAs of the BSS by transmitting a management frame, such as a Beacon Frame, a Probe Response Frame, or an Association Response Frame. The AP also may advertise the frequency segment composition that the WLAN devices of the BSS should use when operating at 320 MHz bandwidth. For example, the AP may indicate one of the following frequency segment compositions: (1) a single 320 MHz frequency segment, (2) 160+160 MHz frequency segments, (3) 4×80 MHz frequency segments, and (4) 160+2×80 MHz frequency segments. The AP also may indicate the center frequency associated with each of the segments of the frequency segment composition selected by the AP. The AP may indicate the operating information for the BSS, such as the 320 MHz operating bandwidth, the frequency segment composition, and the corresponding center frequency of each segment, in an EHT Operation Information Element (IE) of the management frame. In some implementations, the AP may select a 320 MHz operating bandwidth and the frequency segment composition for the BSS based on the capabilities of the WLAN devices of the BSS.

In some implementations, during network discovery, the AP and the STAs of the BSS may exchange management frames that advertise the capabilities of the WLAN devices. For example, the management frames exchanged by the AP and the STAs may indicate the operating bandwidth supported by each WLAN device, and one or more frequency segment compositions supported by each WLAN device. The AP may transmit a Beacon Frame or a Probe Response Frame to indicate the bandwidth capabilities of the AP, and each of the STAs may send a Probe Request to indicate the bandwidth capabilities of the corresponding STA. Some EHT devices may indicate support of an operating bandwidth of up to 320 MHz, and some non-EHT devices may indicate support of an operating bandwidth of up to 160 MHz. In some implementations, the support for a 320 MHz operating bandwidth may be an optional feature for EHT devices, and thus some EHT devices may not support a 320 MHz operating bandwidth, and instead may indicate support for a 160 MHz operating bandwidth. The AP and STAs may indicate their bandwidth capabilities information, such as support for the 320 MHz operating bandwidth and support for one or more frequency segment compositions, in an EHT Capabilities Information Element (IE) of a management frame. In some implementations, the AP of the BSS may set the operating bandwidth and the frequency segment composition for the BSS based on the capabilities information received from the STAs.

In some implementations, the BSS may include both EHT and non-EHT devices. Non-EHT devices may be, for example, 802.11ax devices (which also may be referred to as High Efficiency (HE) devices) that support a maximum operating bandwidth of 160 MHz (and therefore do not support a 320 MHz operating bandwidth). If the BSS includes both EHT and non-EHT devices, the AP may transmit two different Operation IEs in a management frame to ensure compatibility with both EHT and non-EHT devices. For example, the management frame may include an EHT Operation IE directed to (and can be decoded by) EHT devices, and an HE Operation IE directed to (and can be decoded by) non-EHT devices. In some implementations, some EHT devices may not support a 320 MHz operating bandwidth, and instead may support a maximum operating bandwidth of 160 MHz. If the BSS includes both EHT devices that support a 320 MHz operating bandwidth and EHT devices that do not support a 320 MHz operating bandwidth, the AP may transmit a management frame that includes an EHT Operation IE directed to (and can be decoded by) all of the EHT devices, and an HE Operation IE directed to (and can be decoded by) the EHT devices that do not support a 320 MHz operating bandwidth.

Particular implementations of the subject matter described in this disclosure can be implemented to realize one or more of the following potential advantages. The IEEE 802.11 standards body is planning to define support for a 320 MHz operating bandwidth into the 802.11 standards specification. The management frame exchange and bandwidth signaling and related operations described in this disclosure allows EHT devices (such as APs and STAs) that support a 320 MHz operating bandwidth to exchange capabilities and operating bandwidth information. An AP can send an EHT Operation IE to the STAs of a BSS to advertise a 320 MHz operating bandwidth for the BSS, the corresponding frequency segment composition, and the center frequency associated with each of the segments of the selected frequency segment composition. The format (including the various fields and subfields) of the EHT Operation IE accounts for the various frequency segment compositions that are available for the 320 MHz operating frequency, and allows the AP to indicate the center frequency of all the frequency segments that correspond to the selected frequency segment composition. The AP setting up the BSS with a 320 MHz operating frequency when at least one of STAs supports 320 MHz bandwidth operation (determined based on the EHT Capabilities IE) may allow one or more of the STAs to operate at a higher bandwidth (compared to non-EHT devices) and may improve performance of the BSS. In some implementations, if the BSS includes both EHT devices that support a 320 MHz operating bandwidth and other devices (such as non-EHT or EHT devices) that do not support a 320 MHz operating bandwidth, the AP may prepare a management frame that includes both an EHT Operation IE directed to EHT devices and an HE Operation IE directed to non-EHT devices (or EHT devices that do not support 320 MHz). A management frame that includes both an EHT Operation IE and an HE Operation HE ensures backward compatibility with non-EHT (or legacy) devices.

FIG. 1 depicts a system diagram of an example wireless communication network 100. According to some aspects, the wireless communication network 100 can be an example of a WLAN (and will hereinafter be referred to as WLAN 100). For example, the WLAN 100 can be a network implementing at least one of the IEEE 802.11 family of standards. The WLAN 100 may include numerous wireless devices (also referred to as WLAN devices) such as an AP 105 and multiple associated STAs 115. Each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), printers, key fobs (for example, for passive keyless entry and start (PKES) systems), among other possibilities.

Each of the STAs 115 may associate and communicate with the AP 105 via a communication link 110. The various STAs 115 in the WLAN 100 are able to communicate with one another through the AP 105. A single AP 105 and an associated set of STAs 115 may be referred to as a BSS. FIG. 1 additionally shows an example coverage area 120 of the AP 105, which may represent a basic service area (BSA) of the WLAN 100. While only one AP 105 is shown, the WLAN 100 can include multiple APs 105. An extended service set (ESS) may include a set of connected BSSs. An extended network station associated with the WLAN 100 may be connected to a wired or wireless distribution system that may allow multiple APs 105 to be connected in such an ESS. As such, a STA 115 can be covered by more than one AP 105 and can associate with different APs 105 at different times for different transmissions.

The STAs 115 may function and communicate (via the respective communication links 110) according to the IEEE 802.11 family of standards and amendments including, but not limited to, 802.11a, 802.11b, 802.11g, 802.11n, 802.11ac, 802.11ad, 802.11ah, 802.11ay, 802.11ax, 802.11az, and 802.11ba. These standards define the WLAN radio and baseband protocols for the PHY and medium access control (MAC) layers. The wireless devices in the WLAN 100 may communicate over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. The unlicensed spectrum also may include other frequency bands, such as the emerging 6 GHz band. The wireless devices in the WLAN 100 also can be configured to communicate over other frequency bands such as shared licensed frequency bands, where multiple operators may have a license to operate in the same or overlapping frequency band or bands.

In some cases, the STAs 115 may form networks without APs 105 or other equipment other than the STAs 115 themselves. One example of such a network is an ad hoc network (or wireless ad hoc network). Ad hoc networks may alternatively be referred to as mesh networks or peer-to-peer (P2P) connections. In some cases, ad hoc networks may be implemented within a larger wireless network such as the WLAN 100. In such implementations, while the STAs 115 may be capable of communicating with each other through the AP 105 using communication links 110, the STAs 115 also can communicate directly with each other via direct wireless communication links 125. Additionally, two STAs 115 may communicate via a direct wireless communication link 125 regardless of whether both STAs 115 are associated with and served by the same AP 105. In such an ad hoc system, one or more of the STAs 115 may assume the role filled by the AP 105 in a BSS. Such a STA 115 may be referred to as a group owner (GO) and may coordinate transmissions within the ad hoc network. Examples of direct wireless communication links 125 include Wi-Fi Direct connections, connections established by using a Wi-Fi Tunneled Direct Link Setup (TDLS) link, and other peer-to-peer (P2P) group connections.

Some types of STAs 115 may provide for automated communication. Automated wireless devices may include those implementing internet-of-things (IoT) communication, Machine-to-Machine (M2M) communication, or machine type communication (MTC). IoT, M2M or MTC may refer to data communication technologies that allow devices to communicate without human intervention. For example, IoT, M2M or MTC may refer to communications from the STAs 115 that integrate sensors or meters to measure or capture information and relay that information to a central server or application program that can make use of the information or present the information to humans interacting with the program or application.

Some of the STAs 115 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices also may be configured to enter a power saving "deep sleep" mode when not engaging in active communications.

The WLAN 100 may support beamformed transmissions. As an example, the AP 105 may use multiple antennas or antenna arrays to conduct beamforming operations for directional communications with a STA 115. Beamforming (which also may be referred to as spatial filtering or directional transmission) is a signal processing technique that may be used at a transmitter (such as the AP 105) to shape or steer an overall antenna beam in the direction of a target receiver (such as a STA 115). Beamforming may be achieved by combining elements in an antenna array in such a way that transmitted signals at particular angles experience constructive interference while others experience destructive interference. In some cases, the ways in which the elements of the antenna array are combined at the transmitter may depend on channel state information (CSI) associated with the channels over which the AP 105 may communicate with the STA 115. That is, based on this CSI, the AP 105 may appropriately weight the transmissions from each antenna (or antenna port) such that the desired beamforming effects are achieved. In some cases, these weights may be determined before beamforming can be employed. For example, the transmitter (such as the AP 105) may transmit one or more sounding packets to the receiver in order to determine the CSI.

The WLAN 100 may further support multiple-input, multiple-output (MIMO) wireless systems. Such systems may use a transmission scheme between a transmitter (such as the AP 105) and a receiver (such as a STA 115), where both transmitter and receiver are equipped with multiple antennas. For example, the AP 105 may have an antenna array with a number of rows and columns of antenna ports that the AP 105 may use for beamforming in its communication with a STA 115. Signals may be transmitted multiple times in different directions (for example, each transmission may be beamformed differently). The receiver (such as the STA 115) may try multiple beams (for example, antenna subarrays) while receiving the signals.

WLAN PDUs may be transmitted over a radio frequency spectrum band, which in some examples may include multiple sub-bands or frequency channels. In some cases, the radio frequency spectrum band may have a bandwidth of 80 MHz, and each of the sub-bands or channels may have a bandwidth of 20 MHz. Transmissions to and from the STAs 115 and the APs 105 typically include control information within a header that is transmitted prior to data transmissions. The information provided in a header is used by a receiving device to decode the subsequent data. A legacy WLAN preamble may include legacy short training field (STF) (L-STF) information, legacy long training field (LTF) (L-LTF) information, and legacy signaling (L-SIG) information. The legacy preamble may be used for packet detection, automatic gain control and channel estimation, among other uses. The legacy preamble also may be used to maintain compatibility with legacy devices.

In some cases, aspects of transmissions may vary based on a distance between a transmitter (for example, the AP 105) and a receiver (for example, a STA 115). The WLAN 100 may otherwise generally benefit from the AP 105 having information regarding the location of the various STAs 115 within the coverage area 120. For example, relevant distances may be computed using round-trip time (RTT)-based ranging procedures. As an example, the WLAN 100 may offer such functionality that produces accuracy on the order of one meter (or even centimeter-level accuracy). The same (or similar) techniques employed in the WLAN 100 may be applied across other radio access technologies (RATs). For example, such RTT-based ranging functionality may be employed in developing "relative geofencing" applications (such as applications where there is a geofence relative to an object of interest such as a mobile device, a car, a person, etc.). Various such examples are considered in accordance with aspects of the present disclosure. For example, car keys may employ RTT estimation for PKES systems. RTT-based geofences around an adult may monitor the position of a child within the geofence. Additionally, drone-to-drone and car-to-car RTT functionality may help prevent collisions.

In some implementations, during network discovery, a STA 115 may perform active scanning in the WLAN 100 by sending Probe Request Frames that indicate the bandwidth capabilities of the STA 115. The AP 105 may receive one of the Probe Request Frames, and send a Probe Response Frame to the STA 115 that indicates the bandwidth capabilities of the AP 105. For example, the Probe Request and Response Frames that are exchanged may indicate the operating bandwidth (such as 320 MHz operating bandwidth) and one or more frequency segment compositions supported by each device. The AP 105 also may periodically send a Beacon Frame that indicates the bandwidth capabilities of the AP 105. After determining the bandwidth capabilities of the STAs 115 of the WLAN 100, the AP 105 may set the operating channel, bandwidth, and other information for a BSS by sending a management frame to the STAs 115. For example, the AP 105 may send a Beacon Frame or an Association Response Frame to the STAs 115 that indicates the operating information for the BSS, such as a 320 MHz operating bandwidth, the frequency segment composition, and the corresponding center frequency of each segment. As described in FIGS. 2 and 3, the AP 105 and each STA 115 may include a bandwidth capability module that may be used to prepare management frames to indicate the AP's and STA's bandwidth capabilities information. The AP 105 also may include an operating bandwidth determination module to determine and set the operating bandwidth information for the BSS.

Figure 2:
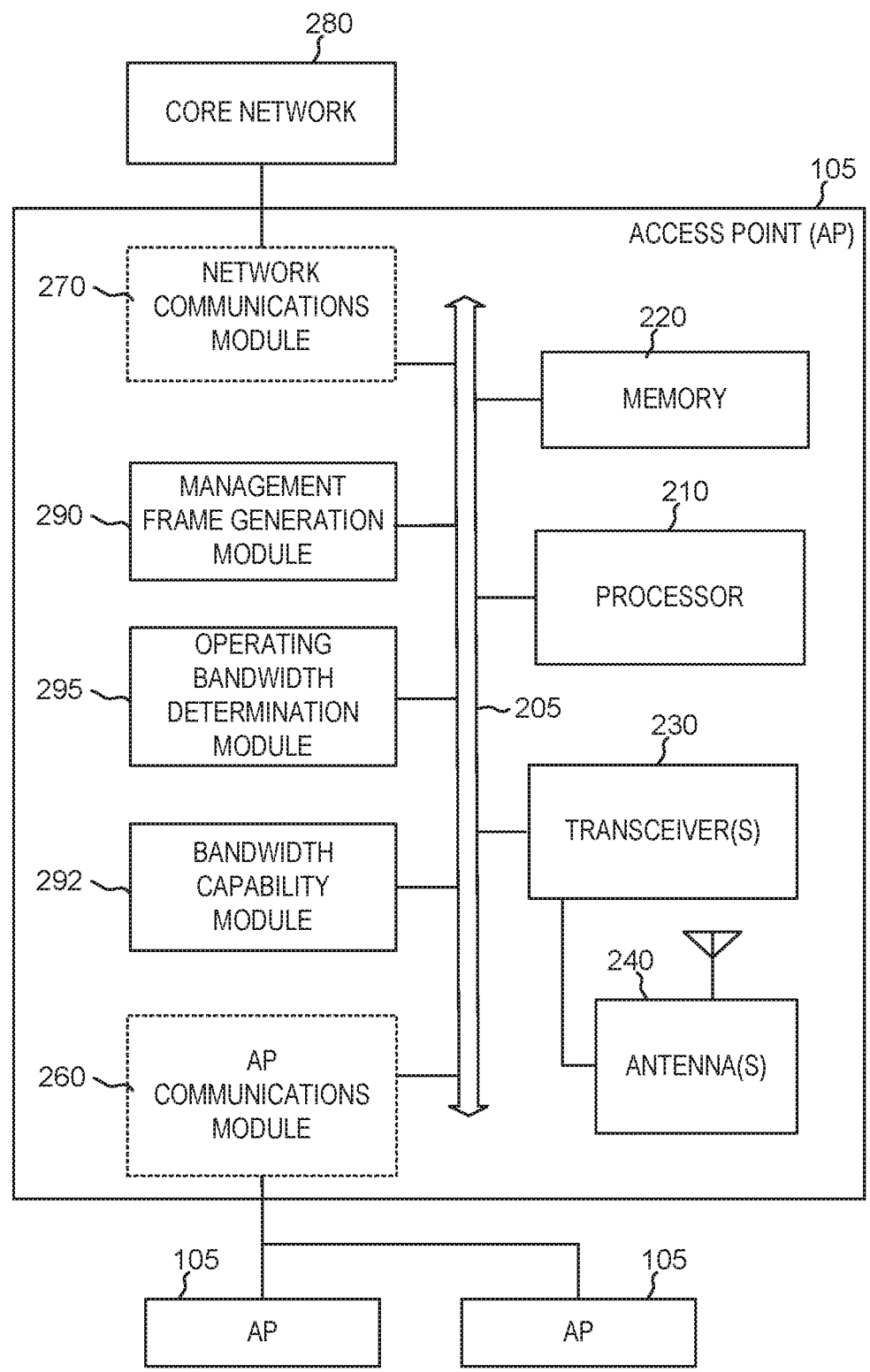
FIG. 2 depicts a block diagram of an example access point (AP) for use in wireless communication.

FIG. 2 depicts a block diagram of an example AP 105 for use in wireless communication. The AP 105 and its components shown in FIG. 2 may be an example of the AP described with reference to FIG. 1. In some implementations, the AP 105 can be configured to send and receive WLAN frames (also referred to herein as transmissions or communications) purporting to comply with the IEEE 802.11 standard (such as the 802.11ac, 802.11ax, or any future amendments to the 802.11 family of standards), as well as to encode and decode such frames. The AP 105 includes a processor 210, a memory 220, at least one transceiver 230, and at least one antenna 240. In some implementations, the AP 105 also includes one or both of an AP communications module 260 and a network communications module 270. Each of the components (or "modules") described with reference to FIG. 2 can communicate with one another, directly or indirectly, over at least one bus 205.

The memory 220 can include random access memory (RAM) and read-only memory (ROM). The memory 220 also can store processor- or computer-executable software (SW) code containing instructions that, when executed by the processor 210, cause the processor 210 to perform various functions described herein for wireless communication, including generation and transmission of a downlink frame and reception of an uplink frame.

The processor 210 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 210 can process information received through the transceiver 230, the AP communications module 260, and the network communications module 270. The processor 210 also can process information to be sent to the transceiver 230 for transmission through the antenna 240, information to be sent to the AP communications module 260, and information to be sent to the network communications module 270. The processor 210 can generally be configured to perform various operations related to generating and transmitting a downlink frame and receiving an uplink frame.

The transceiver 230 can include a modem to modulate packets and provide the modulated packets to the antenna 240 for transmission, as well as to demodulate packets received from the antenna 240. The transceiver 230 can be implemented as at least one radio frequency (RF) transmitter and at least one separate RF receiver. The transceiver 230 can communicate bi-directionally, via the antenna 240, with at least one STA 115 as, for example, shown in FIG. 1. Although only one transceiver 230 and one antenna 240 are shown in FIG. 2, the AP 105 can typically include multiple transceivers 230 and antennas 240. For example, in some implementations, the AP 105 can include multiple transmit antennas (each with a corresponding transmit chain) and multiple receive antennas (each with a corresponding receive chain). The AP 105 may communicate with a core network 280 through the network communications module 270. The system also may communicate with other APs 105 using the AP communications module 260.

The AP 105 also may include a management frame generation module 290 to generate management frames for advertising the AP's capabilities and bandwidth information. For example, the management frame generation module 290 may generate Beacon Frames, Probe Response Frames, and Association Response Frames. The AP 105 may include a bandwidth capability module 292 to determine and store the bandwidth capabilities of the AP 105. For example, the bandwidth capability module 292 may determine the AP 105 supports a 320 MHz bandwidth and store an indication of the AP's supported bandwidth. The bandwidth capability module 292 also may determine and store one or more of the frequency segment compositions associated with the 320 MHz bandwidth that are supported by the AP 105. The management frame generation module 290 may determine the AP's bandwidth capabilities (such as from the bandwidth capability module 292) and generate a management frame to advertise the AP's supported bandwidth and frequency segment compositions to the WLAN. For example, the management frame generation module 290 may prepare a management frame that indicates the AP's bandwidth capabilities in a Bandwidth Support field of an EHT Capabilities IE (as described in FIGS. 4 and 5).

The AP 105 also may include an operating bandwidth determination module 295 to determine the operating bandwidth and the frequency segment composition for a BSS of the AP 105. The operating bandwidth determination module 295 may determine the operating bandwidth and the frequency segment composition for the BSS based on the AP's bandwidth capabilities and the bandwidth capabilities of the one or more STAs 115 of the WLAN (such as one or more STAs 115 that are attempting to join the BSS). The management frame generation module 290 may determine the operating bandwidth and the frequency segment composition (such as from the operating bandwidth determination module 295) and generate a management frame to advertise the operating bandwidth and the frequency segment composition to the one or more STAs 115 of the WLAN. For example, the management frame generation module 290 may prepare a management frame that indicates the operating bandwidth and the frequency segment composition (and the corresponding center frequency of each segment) in an Operation Bandwidth field of an EHT Operation IE (as described in FIGS. 4 and 6). Operation Bandwidth field of the EHT Operation IE may indicate a 320 MHz operating bandwidth and a corresponding frequency segment composition. The Operation Bandwidth field may not be exclusive to indicating a 320 MHz operating bandwidth and its frequency segment composition. The Operating Bandwidth field of the EHT Operation IE may indicate an operating bandwidth of up to 320 MHz (also referred to as a maximum operating bandwidth), and thus also may indicate support for 20/40/80/160 MHz bandwidth operation mode as well.

Figure 3:
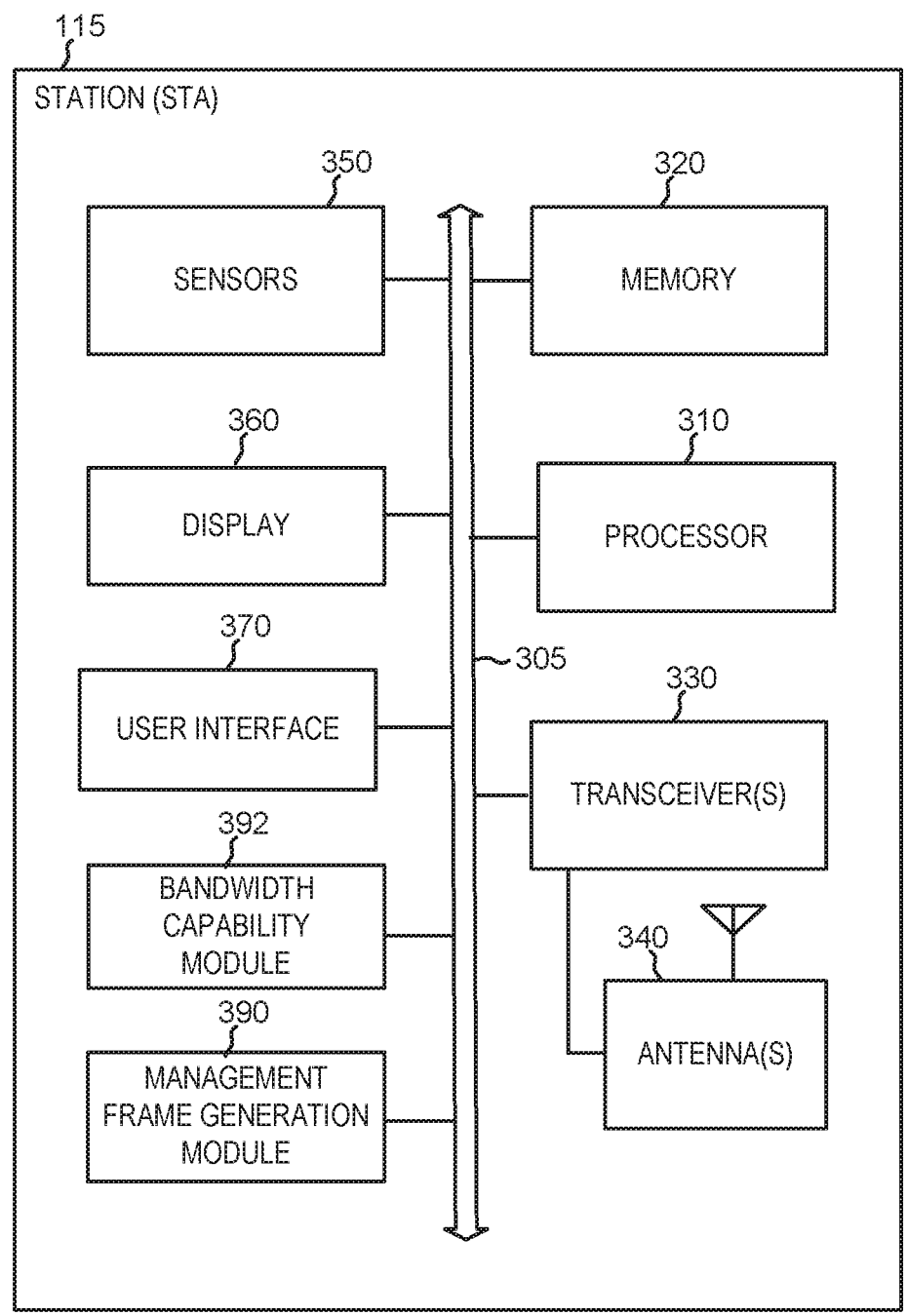
FIG. 3 depicts a block diagram of an example station (STA) for use in wireless communication.

FIG. 3 depicts a block diagram of an example STA 115 for use in wireless communication. For example, the STA 115 may be an example of aspects of the STAs described with reference to FIG. 1. In some implementations, the STA 115 can be configured to send and receive WLAN frames (also referred to herein as transmissions or communications) purporting to comply with the IEEE 802.11 standard (such as the 802.11ac, 802.11ax, or any future amendments to the 802.11 family of standards), as well as to encode and decode such frames. The STA 115 includes a processor 310, a memory 320, at least one transceiver 330, and at least one antenna 340. In some implementations, the STA 115 additionally includes one or more of sensors 350, a display 360, and a user interface (UI) 370 (such as a touchscreen or keypad). Each of the components (or "modules") described with reference to FIG. 3 can communicate with one another, directly or indirectly, over at least one bus 305.

The memory 320 can include RAM and ROM. The memory 320 also can store processor- or computer-executable SW code containing instructions that, when executed, cause the processor 310 to perform various functions described herein for wireless communication, including reception of a downlink frame and generation and transmission of an uplink frame.

The processor 310 includes an intelligent hardware device such as, for example, a CPU, a microcontroller, an ASIC, or a PLD such as an FPGA, among other possibilities. The processor 310 processes information received through the transceiver 330 as well as information to be sent to the transceiver 330 for transmission through the antenna 340. The processor 310 can be configured to perform various operations related to receiving a downlink frame and generating and transmitting an uplink frame.

The transceiver 330 can include a modem to modulate packets and provide the modulated packets to the antenna 340 for transmission, as well as to demodulate packets received from the antenna 340. The transceiver 330 can be implemented as at least one RF transmitter and at least one separate RF receiver. The transceiver 330 can communicate bi-directionally, via the antenna 340, with at least one AP 105 as, for example, shown in FIG. 1. Although only one transceiver 330 and one antenna 340 are shown in FIG. 3, the STA 115 can include two or more antennas. For example, in some implementations, the STA 115 can include multiple transmit antennas (each with a corresponding transmit chain) and multiple receive antennas (each with a corresponding receive chain).

The STA 115 also may include a management frame generation module 390 to generate management frames for advertising the STA's bandwidth capabilities information. For example, the management frame generation module 390 may generate Probe Request Frames, and Association Request Frames. The STA 115 may include a bandwidth capability module 392 to determine and store the bandwidth capabilities of the STA 115. For example, the bandwidth capability module 392 may determine the STA 115 supports a 320 MHz bandwidth and store an indication of the STA's supported bandwidth. The bandwidth capability module 392 also may determine and store one or more of the frequency segment compositions associated with the 320 MHz bandwidth that are supported by the STA 115. The management frame generation module 390 may determine the STA's bandwidth capabilities (such as from the bandwidth capability module 392) and generate a management frame to advertise the STA's supported bandwidth and frequency segment compositions to the AP 105 and other STAs 115 of the WLAN. For example, the management frame generation module 390 may prepare a management frame that indicates the STA's bandwidth capabilities in a Bandwidth Support field of an EHT Capabilities IE (as described in FIGS. 4 and 5). The STA 115 may use the EHT Capabilities IE to advertise support of 320 MHz bandwidth and one or more frequency segment compositions.

Figure 4:
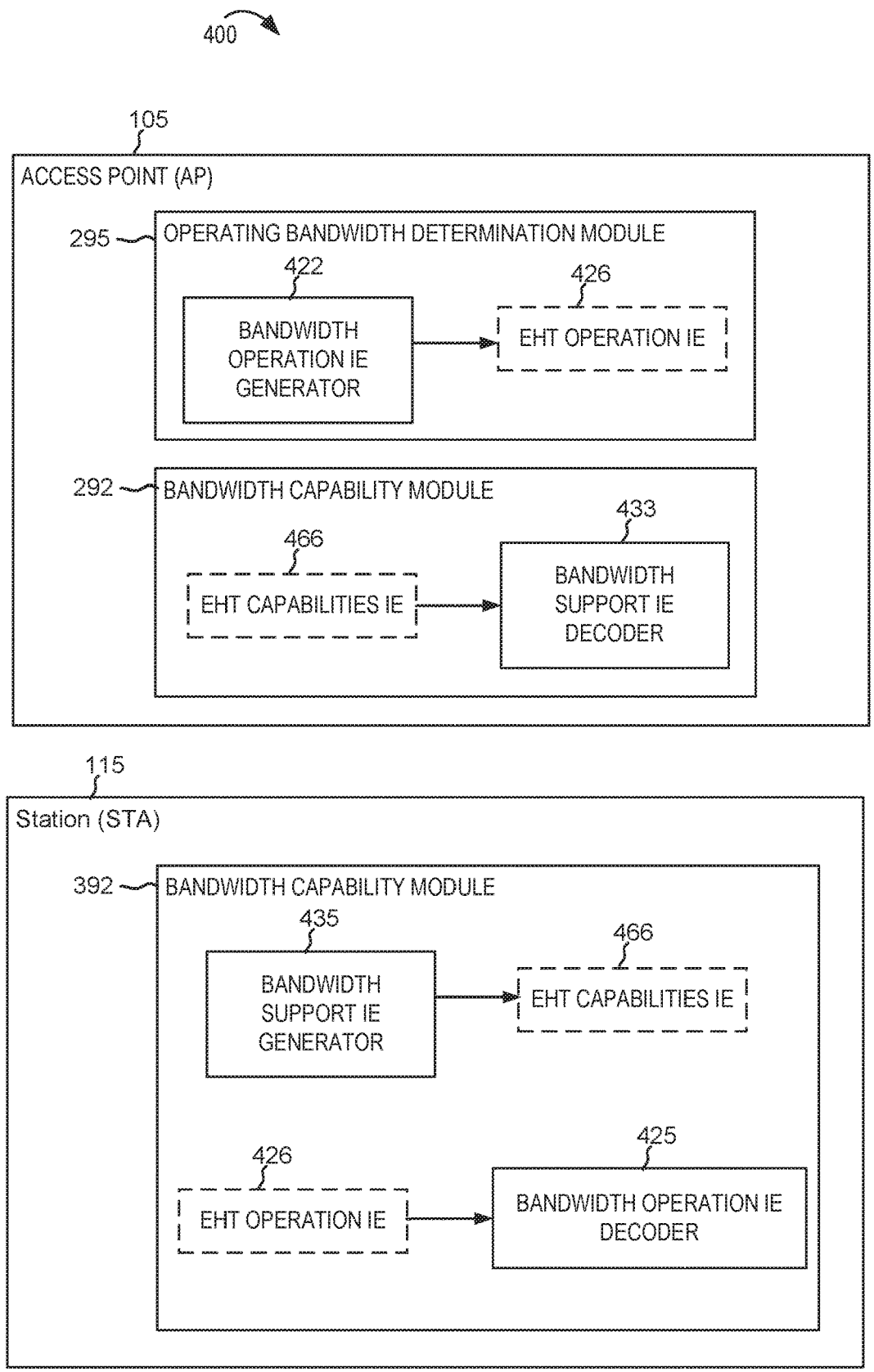
FIG. 4 depicts a block diagram of an example Extremely High Throughput (EHT) 320 MHz bandwidth signaling in an EHT BSS.

FIG. 4 depicts a block diagram of an example EHT 320 MHz bandwidth signaling 400 in an EHT BSS. EHT 320 MHz bandwidth signaling 400 in an EHT BSS includes transmit processing and receive processing for two information elements (IEs): (1) an EHT Operation IE 426 for use by an AP (such as an AP 105) to advertise to STAs in its BSS (such as a STA 115) 320 MHz bandwidth operation, and (2) an EHT Capabilities IE 466 for use by a WLAN device (such as a STA 115 or an AP 105) to advertise its support of 320 MHz bandwidth operation.

In some implementations, both the AP 105 and the STA 115 may advertise (transmit and receive) a Bandwidth Support field of an EHT Capabilities IE. The AP 105 also may transmit and the STA 115 receive an Operation Bandwidth field of an EHT Operation IE. For example, as shown in FIG. 4, the AP 105 can include an operating bandwidth determination module 295 for determining and handling the EHT Operation IE 426. The operating bandwidth determination module 295 may include a bandwidth operation IE generator 422 that generates the EHT Operation IE 426. For example, the bandwidth operation IE generator 422 may generate and store the EHT Operation IE 426 for access by the management frame generation module 290 (shown in FIG. 2) when preparing a management frame, or may generate and send the EHT Operation IE 426 to the management frame generation module 290. The STA 115 can include a bandwidth capability module 392 that may receive and process the EHT Operation IE 426. The EHT Operation IE 426 may be included in a management frame received by the STA 115 from the AP 105. For example, the bandwidth capability module 392 may include a bandwidth operation IE decoder 425 for receiving and decoding the EHT Operation IE 426. After decoding the EHT Operation IE 426, the bandwidth capability module 392 may determine that the AP 105 operates with a 320 MHz bandwidth and the specific frequency segment composition associated with the 320 MHz bandwidth.

In some implementations, the STA 115 also can utilize the bandwidth capability module 392 for determining and handling the EHT Capabilities IE 466. The bandwidth capability module 392 may include a bandwidth support IE generator 435 that generates the EHT Capabilities IE 466. For example, the bandwidth support IE generator 435 may generate and store the EHT Capabilities IE 466 for access by the management frame generation module 390 (shown in FIG. 3) when preparing a management frame, or may generate and send the EHT Capabilities IE 466 to the management frame generation module 390. The AP 105 can include a bandwidth capability module 292 that may receive and process the EHT Capabilities IE 466 from the STA 115. For example, the bandwidth capability module 292 may include a bandwidth support IE decoder 433 for receiving and decoding the EHT Capabilities IE 466, and determining that the STA 115 supports operating in a 320 MHz bandwidth and one or more frequency segment compositions associated with the 320 MHz bandwidth.

Figure 5:
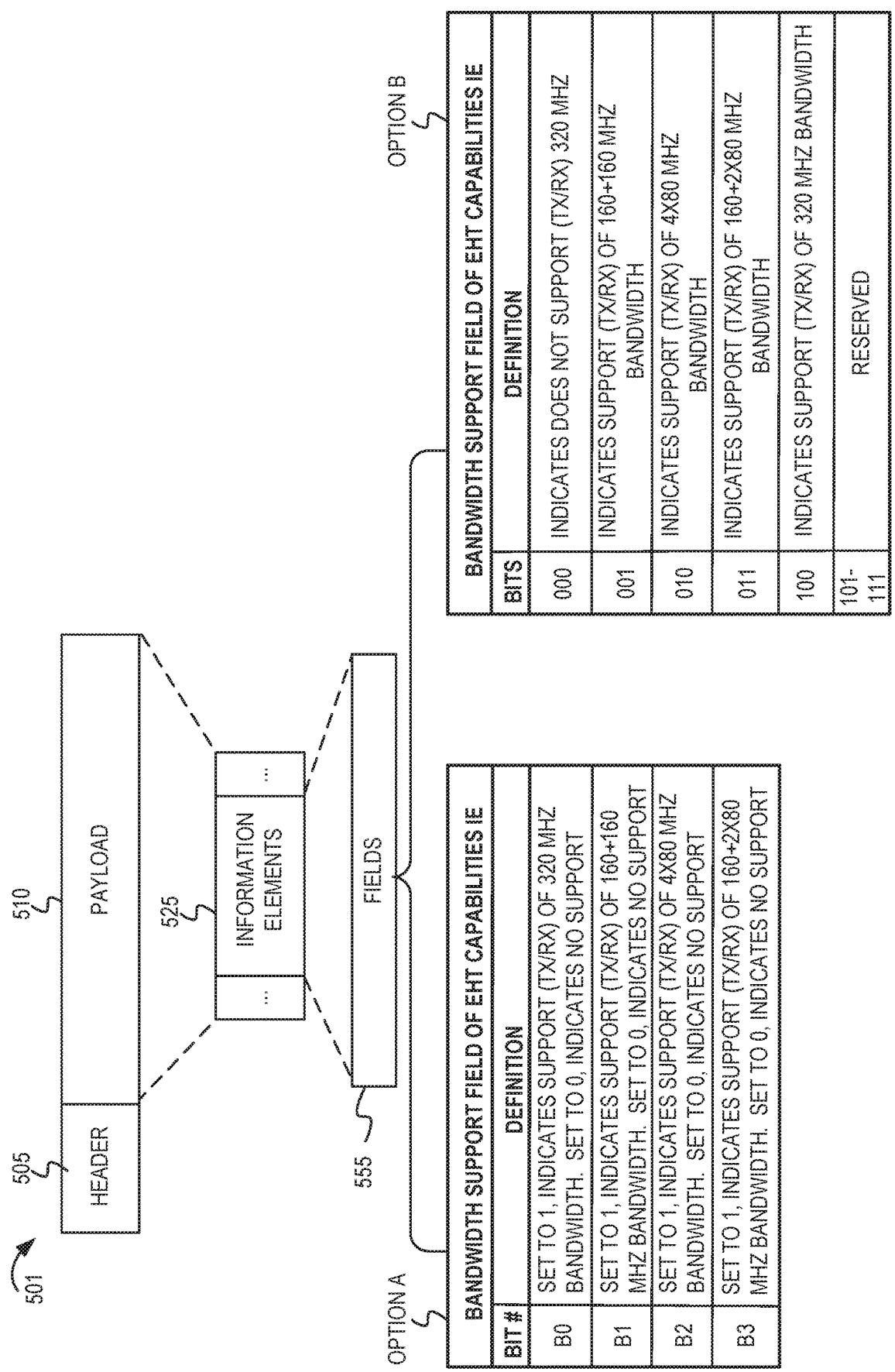
FIG. 5 depicts a conceptual diagram of an example management frame for EHT 320 MHz bandwidth signaling including an example Bandwidth Support field of an EHT Capabilities Information Element (IE).

FIG. 5 depicts a conceptual diagram of an example management frame 501 for EHT 320 MHz bandwidth signaling including an example Bandwidth Support field of an EHT Capabilities IE. The management frame 501 may be sent by an AP or a STA, such as the AP 105 or the STA 115 shown in FIGS. 1-4. The management frame 501 may include at least a header 505 and a payload 510. In some implementations, the header 505 may include a source network identifier, the length of data frame, or other frame control information. The payload 510 may include various Information Elements (IEs) 525, and each of the IEs 525 may include one or more fields 555. For example, as described in FIGS. 3 and 4, a WLAN device (such as a STA 115 or an AP 105) may transmit a management frame (such as the management frame 501) that includes an EHT Capabilities IE. The EHT Capabilities IE may be one of the IEs 525 of the management frame 501 shown in FIG. 5, and the Bandwidth Support field of the EHT Capabilities IE may be one of the fields 555.

In some implementations, the Bandwidth Support field of the EHT Capabilities IE (also referred to herein as a physical layer (PHY) capabilities IE) may indicate whether or not the WLAN device supports a 320 MHz bandwidth (also referred to herein as a 320 MHz channel width). If the device supports a 320 MHz bandwidth, then the WLAN device may further advertise the frequency segment composition(s) associated with the 320 MHz bandwidth that are supported by the WLAN device. For example, the Bandwidth Support field of the EHT Capabilities IE may indicate support for one or more of the following frequency segment compositions: (1) a single 320 MHz frequency segment, (2) 160+160 MHz frequency segments, (3) 4×80 MHz frequency segments, and (4) 160+2×80 MHz frequency segments. It is noted that the specific frequency segment composition and the resulting signal waveforms may be different for each of the above frequency segment composition options, and the treatment of the waveforms (such as in the receive processing) may be different for each of the above frequency segment compositions. For example, each of the frequency segment compositions may have a different number of segments, and different center frequencies associated with each of the corresponding segments.

In some implementations, the Bandwidth Support field of the EHT Capabilities IE may utilize two or more bits to advertise the WLAN device's bandwidth capabilities information, and may be formatted in various different ways. For example, the format of the Bandwidth Support field of the EHT Capabilities IE may be the format shown in Option A or Option B of FIG. 5. It is noted that various other formats may be used and two example formats are shown herein for simplicity.

In some implementations, Option A of the Bandwidth Support field may include 4 bits (or a bitmap of 4 bits), such as bits B0, B1, B2, and B3, for indicating whether or not the device supports a 320 MHz bandwidth, and any supported frequency segment composition(s). When bit B0 is set to 1, the Bandwidth Support field indicates that the device supports the 320 MHz bandwidth and a frequency segment composition of 320 MHz bandwidth (which translates to a single frequency segment of 320 MHz bandwidth). When bit B1 is set to 1, the Bandwidth Support field indicates that the device supports the 320 MHz bandwidth and a frequency segment composition of 160+160 MHz bandwidth (which translates to two contiguous or non-contiguous frequency segments, each having a 160 MHz bandwidth). When bit B2 is set to 1, the Bandwidth Support field indicates that the device supports the 320 MHz bandwidth and a frequency segment composition of 4×80 MHz bandwidth (which translates to four contiguous or non-contiguous frequency segments, each having an 80 MHz bandwidth). When bit B3 is set to 1, the Bandwidth Support field indicates that the device supports the 320 MHz bandwidth and a frequency segment composition of 160+2×80 MHz bandwidth (which translates to three contiguous or non-contiguous frequency segments, one frequency segment having a 160 MHz bandwidth and two frequency segments each having a 80 MHz bandwidth). When all of the bits B0, B1, B2, and B3 are set to 0, the Bandwidth Support field indicates that the device does not support a 320 MHz bandwidth. When one or more bits are set to 0 and one or more bits are set to 1, the Bandwidth Support field indicates that the device supports the 320 MHz bandwidth and only supports the one or more frequency segment compositions that are associated with the bit(s) that were set to 1. For example, when bits B0 and B1 is set to 1 and bits B2 and B3 are set to 0, the Bandwidth Support field indicates that the device supports the 320 MHz bandwidth, and supports only the frequency segment compositions of 320 MHz bandwidth and 160+160 MHz bandwidth.

In some implementations, Option B of the Bandwidth Support field may include 3 bits (or a 3-bit field) for indicating whether or not the device supports a 320 MHz bandwidth, and any supported frequency segment composition(s). When the binary value of the 3-bit field is set to 000 (which is a decimal value of 0), the Bandwidth Support field indicates that the device does not support a 320 MHz bandwidth. When the binary value of the 3-bit field is set to 001 (which is a decimal value of 1), the Bandwidth Support field indicates that the device supports the 320 MHz bandwidth and a frequency segment composition of 160+160 MHz bandwidth. When the binary value of the 3-bit field is set to 010 (which is a decimal value of 2), the Bandwidth Support field indicates that the device supports the 320 MHz bandwidth and a frequency segment composition of 4×80 MHz bandwidth. When the binary value of the 3-bit field is set to 011 (which is a decimal value of 3), the Bandwidth Support field indicates that the device supports the 320 MHz bandwidth and a frequency segment composition of 160+2×80 MHz bandwidth. When the binary value of the 3-bit field is set to 100 (which is a decimal value of 4), the Bandwidth Support field indicates that the device supports the 320 MHz bandwidth and a frequency segment composition of 320 MHz bandwidth. In some implementations, the binary values for the 3-bit field of 101, 110, and 111 may be reserved or may not have a definition. In some implementations, the binary values for the 3-bit field of 101, 110, and 111 may each indicate support for multiple frequency segment compositions. For example, the binary value of 101 may indicate support for the 320 MHz bandwidth and the frequency segment compositions of 320 MHz bandwidth and 160+160 MHz bandwidth. It is understood that the number of bits and what they represent can be varied to suit a particular application.

FIG. 6 depicts an example EHT Operation IE for EHT 320 MHz bandwidth signaling. An AP (such as the AP 105 shown in FIGS. 1-4) may prepare and send a management frame, such as the management frame 501 shown in FIG. 5, that includes various information elements (IEs) 525, and each of the IEs 525 may include one or more fields 555. For example, as described in FIGS. 2 and 4, the AP 105 may transmit a management frame (such as the management frame 501) that includes an EHT Operation IE. The EHT Operation IE 625 shown in FIG. 6 may be one of the IEs 525 of the management frame 501 shown in FIG. 5, and the Operation Bandwidth field 655 of the EHT Operation IE 625 may be one of the fields 555 of the management frame 501 shown in FIG. 5.

In some implementations, the Operation Bandwidth field 655 of the EHT Operation IE may include a channel number, a channel width (bandwidth), a segment 0 channel center frequency, a segment 1 channel center frequency, a segment 2 channel center frequency, and a segment 3 channel center frequency. Each of these subfields or entries of the Operation Bandwidth field 655 may include two or more bits. For example, each of the subfields or entries of the Operation Bandwidth field 655 may include an octet (eight bits). The channel number (also referred to as the primary channel number) may indicate the channel number of the operating channel (also referred to as the primary channel) for the BSS associated with the AP 105. The channel width (bandwidth) may indicate the operating channel width (which also may be referred to as operating channel bandwidth or operating bandwidth) and the corresponding frequency segment composition, including the number of segments. The operating channel width may indicate the maximum channel width (or the maximum operating bandwidth) and the corresponding frequency segment composition that the devices may utilize in the BSS (including the number of segments). For example, the channel width may indicate the devices of the BSS (such as the AP 105 and the STAs 115) can utilize one of the following operating bandwidths and frequency segment compositions: 20/40/80/160/80+80/320/4×80/160+160/2×80+160 MHz bandwidth. In some implementations, 320 MHz bandwidth operation may support frequency segment compositions of up to four frequency segments (also referred to as segments or channel segments).

The segment 0-3 channel center frequency information may indicate a respective channel center frequency for each frequency segment of the frequency segment composition selected by the AP 105 for the BSS. For example, when the operating bandwidth is set to 320 MHz and the frequency segment composition has a single 320 MHz segment, the subfield associated with the 20/40/60/80/160/320 MHz bandwidths of the segment 0 channel center frequency may indicate the channel center frequency index (CCFI) of the 320 MHz segment. Since there is a single segment, the rest of the subfields of the segment 0 channel center frequency and all of the subfields of the segment 1-3 channel center frequencies may be set to 0. When the operating bandwidth is set to 320 MHz and the frequency segment composition has two 160 MHz segments, the subfield associated with the 160+160 MHz bandwidth of the segment 0 channel center frequency may indicate the CCFI of the lowest 160 MHz segment, and the subfield associated with the 160+160 MHz bandwidth of the segment 1 channel center frequency may indicate the CCFI of the highest 160 MHz segment. Since there are two segments in the 160+160 MHz composition, the rest of the subfields of the segment 0-1 channel center frequencies and all of the subfields of the segment 2-3 channel center frequencies may be set to 0. When the operating bandwidth is set to 160 MHz and the frequency segment composition has two 80 MHz segments, the subfield associated with the 80+80 MHz bandwidth of the segment 0 channel center frequency may indicate the CCFI of the lowest 80 MHz segment, and the subfield associated with the 80+80 MHz bandwidth of the segment 1 channel center frequency may indicate the CCFI of the highest 80 MHz segment. Since there are two segments in the 80+80 MHz composition, the rest of the subfields of the segment 0-1 channel center frequencies and all of the subfields of the segment 2-3 channel center frequencies may be set to 0.

When the operating bandwidth is set to 320 MHz and the frequency segment composition has three segments (two 80 MHz segments and one 160 MHz segment), the subfield associated with the 160+2×80 MHz bandwidth of the segment 0 channel center frequency may indicate the CCFI of the lowest 80 MHz segment, the subfield associated with the 160+2×80 MHz bandwidth of the segment 1 channel center frequency may indicate the CCFI of the highest 80 MHz segment, and the subfield associated with the 160+2×80 MHz bandwidth of the segment 2 channel center frequency may indicate the CCFI of the 160 MHz segment. Since there are three segments in the 160+2×80 MHz composition, the rest of the subfields of the segment 0-2 channel center frequencies and all of the subfields of the segment 3 channel center frequency may be set to 0. When the operating bandwidth is set to 320 MHz and the frequency segment composition has four 80 MHz segments, the subfield associated with the 4×80 MHz bandwidth of the segment 0 channel center frequency may indicate the CCFI of the lowest 80 MHz segment, the subfield associated with the 4×80 MHz bandwidth of the segment 1 channel center frequency may indicate the CCFI of the second 80 MHz segment, the subfield associated with the 4×80 MHz bandwidth of the segment 2 channel center frequency may indicate the CCFI of the third 80 MHz segment, and the subfield associated with the 4×80 MHz bandwidth of the segment 3 channel center frequency may indicate the CCFI of the fourth 80 MHz segment. Since there are four segments in the 4×80 MHz composition, the rest of the subfields of the segment 0-3 channel center frequencies may be set to 0.

It is noted that various other formats may be used for the EHT Operation IE 625 and the Operation Bandwidth field 655 shown in FIG. 6. Also, the bandwidth, frequency segment composition, and center frequency information indicated the subfields may vary. Furthermore, it is understood that the number of bits of each of the fields (and subfields) and what they represent can be varied to suit a particular application.

Figure 7:
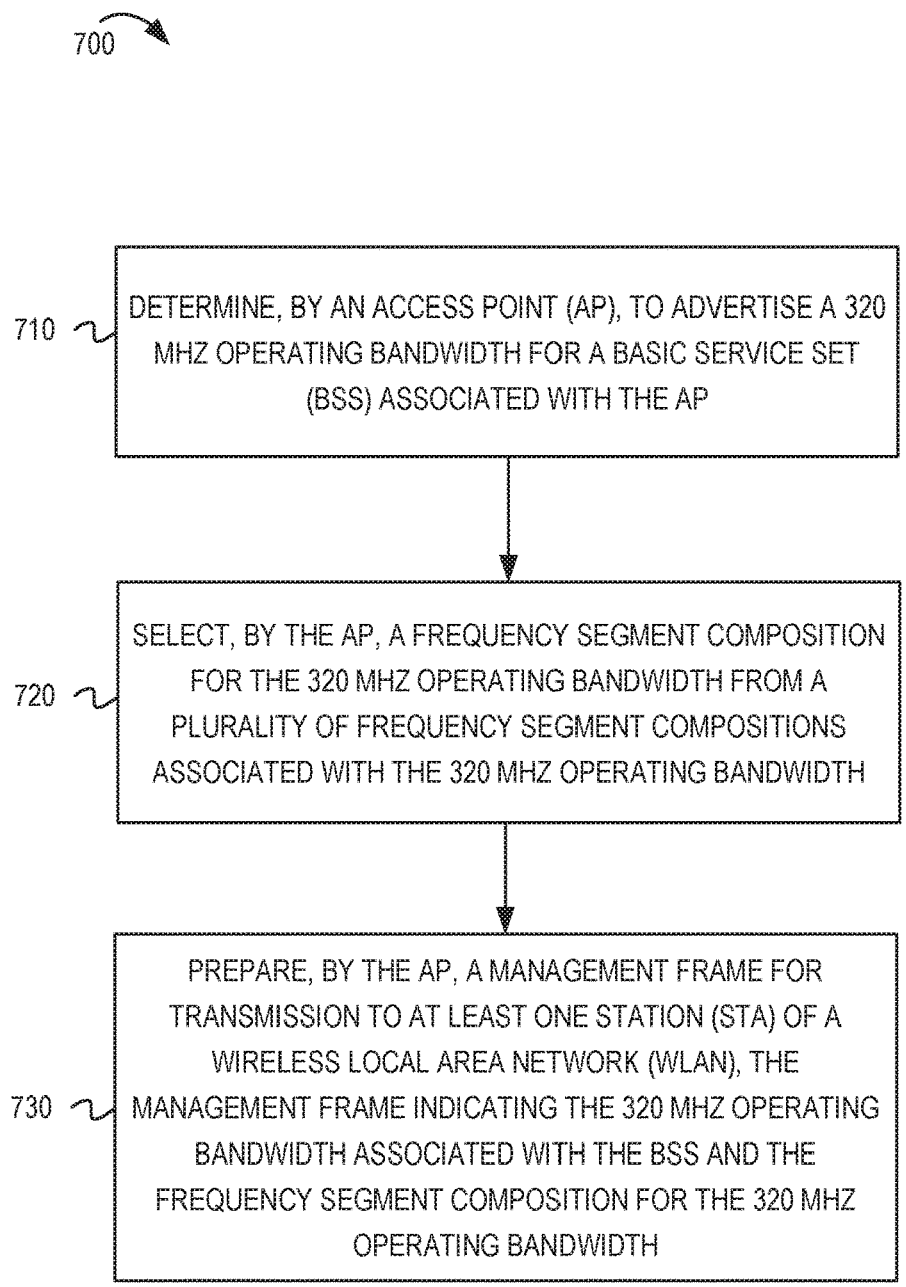
FIG. 7 depicts an example flowchart of a process for an AP to advertise or indicate to one or more STAs of a wireless local area network (WLAN) the 320 MHz operating bandwidth of a BSS and the frequency segment composition for the 320 MHz operating bandwidth.

FIG. 7 depicts an example flowchart 700 of a process for an AP to advertise or indicate to one or more STAs of a WLAN the 320 MHz operating bandwidth of a BSS and the frequency segment composition for the 320 MHz operating bandwidth.

At block 710, an AP (such as the AP 105 of FIGS. 1-4) may determine to advertise a 320 MHz operating bandwidth for a BSS associated with the AP. For example, the AP may be an EHT device that supports a 320 MHz operating bandwidth.

At block 720, the AP may select a frequency segment composition for the 320 MHz operating bandwidth from a plurality of frequency segment compositions associated with the 320 MHz operating bandwidth. For example, the frequency segment composition may be one of the plurality of frequency segment compositions defined for the 320 MHz operating bandwidth, which may include one of: (1) a single 320 MHz frequency segment, (2) two 160 MHz (160+160 MHz) frequency segments (contiguous or non-contiguous), (3) four 80 MHz (4×80 MHz) frequency segments (contiguous or non-contiguous), and (4) one 160 MHz and two 80 MHz (160+2×80 MHz) frequency segments (contiguous or non-contiguous). The AP also may determine a center frequency of each segment associated with the frequency segment composition for the 320 MHz operating bandwidth.

At block 730, the AP may prepare a management frame for transmission to at least one STA of the WLAN. The management frame may be a Beacon Frame, a Probe Response Frame, or an Association Response Frame. The management frame may indicate the 320 MHz operating bandwidth associated with the BSS and the frequency segment composition for the 320 MHz operating bandwidth. The management frame also may indicate the center frequency of each segment associated with the frequency segment composition for the 320 MHz operating bandwidth. In some implementations, the management frame may include an Operation Bandwidth field of an EHT Operation IE (such as the EHT Operation IE shown in FIG. 6) for indicating the operating bandwidth, the frequency segment composition, and center frequency information. The EHT Operation IE can be included, contained, carried, embedded or placed in the management frame. The Operation Bandwidth field of the EHT Operation IE may include a primary channel number for providing a channel number of a primary channel of the BSS, and a channel width for providing a composition of the 320 MHz operating bandwidth and a number of frequency segments. The Operation Bandwidth field of the EHT Operation IE also may include segment channel center frequency information, such as a first segment channel center frequency, a second segment channel center frequency, a third segment channel center frequency, and a fourth segment channel center frequency, for indicating the center frequency of each segment associated with the frequency segment composition for the 320 MHz operating bandwidth.

The AP may transmit the management frame (including the EHT Operation IE) to one or more STAs of the WLAN. On the receive side, a STA receives the Operation Bandwidth Field in the EHT Operation IE and decodes the IE to determine whether the AP in the BSS operates in the 320 MHz bandwidth, and if so, further determines the frequency segment composition of the 320 MHz bandwidth.

Figure 8:
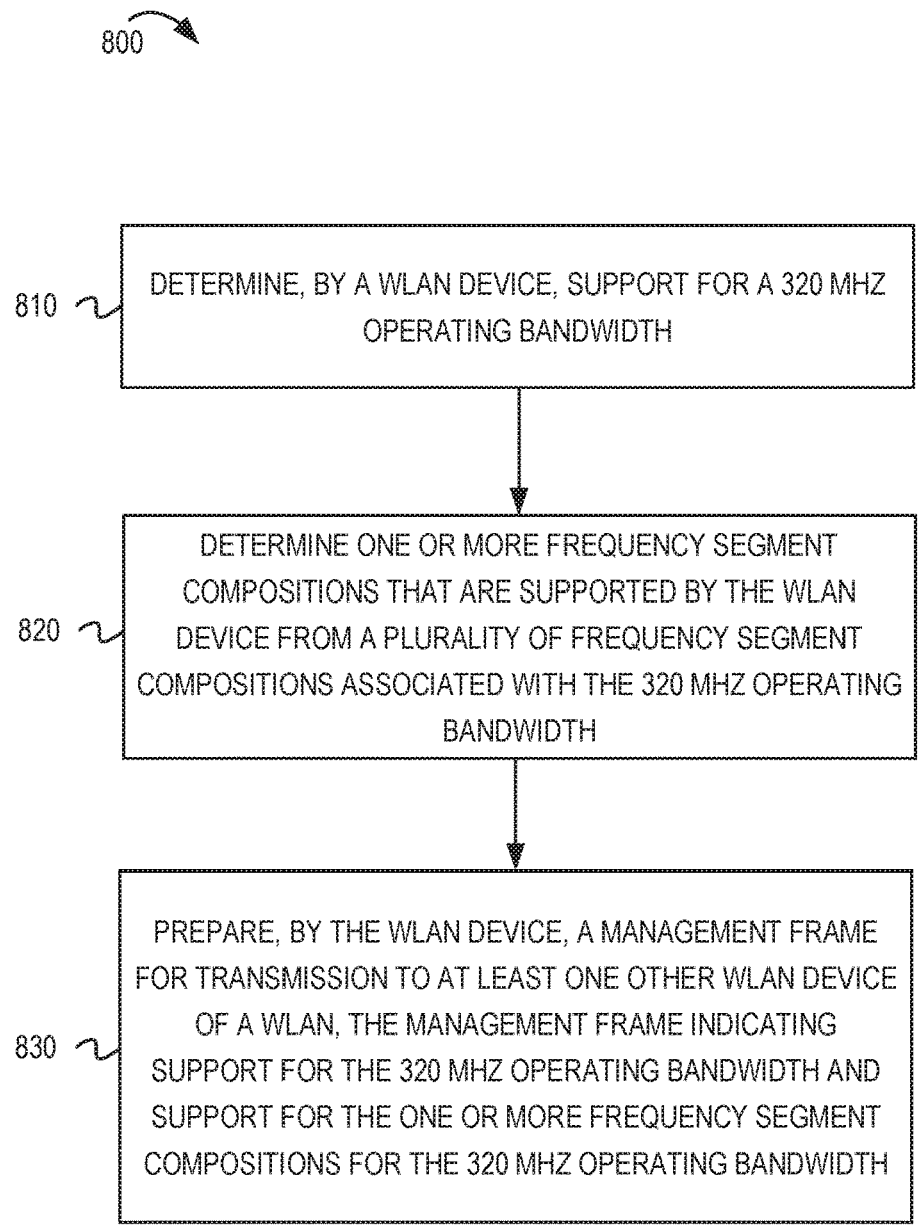
FIG. 8 depicts an example flowchart of a process for a WLAN device to advertise or indicate its 320 MHz bandwidth support capability.

FIG. 8 depicts an example flowchart 800 of a process for a WLAN device to advertise or indicate its 320 MHz bandwidth support capability.

At block 810, a WLAN device (such as the AP 105 or the STA 115 of FIGS. 1-4) may determine it supports a 320 MHz operating bandwidth. For example, the WLAN device may be an EHT device that supports a 320 MHz operating bandwidth.

At block 820, the WLAN device may determine one or more frequency segment compositions that are supported by the WLAN device from a plurality of frequency segment compositions associated with the 320 MHz operating bandwidth. For example, the WLAN device may determine that it supports one or more of the plurality of frequency segment compositions defined for the 320 MHz operating bandwidth, which may include one or more of: (1) a single 320 MHz frequency segment, (2) two 160 MHz (160+160 MHz) frequency segments (contiguous or non-contiguous), (3) four 80 MHz (4×80 MHz) frequency segments (contiguous or non-contiguous), and (4) one 160 MHz and two 80 MHz (160+2×80 MHz) frequency segments (contiguous or non-contiguous).

At block 830, the WLAN device may prepare a management frame for transmission to at least one other WLAN device of a WLAN. The management frame may indicate support for the 320 MHz operating bandwidth and support for the one or more frequency segment compositions for the 320 MHz operating bandwidth. In some implementations, the management frame may include Bandwidth Support field of an EHT Capabilities IE (such as the EHT Capabilities IE shown in FIG. 5) for indicating whether or not the WLAN device supports a 320 MHz operating bandwidth. If 320 MHz bandwidth is supported, the Bandwidth Support field of an EHT Capabilities IE also may include an indication of the one or more frequency segment compositions that are supported by the WLAN device. The EHT Capabilities IE can be included, contained, carried, embedded or placed in the management frame. If the WLAN device is a STA, the management frame may be a Probe Request Frame or an Association Request Frame. When the WLAN device is an AP, the management frame may be a Beacon Frame, a Probe Response Frame, or an Association Response Frame.

The WLAN device may transmit the management frame (including the EHT Capabilities IE) to one or more other WLAN devices in the WLAN to indicate its bandwidth capabilities. On the receive side, another WLAN device receives and decodes the EHT Capabilities IE to determine whether the WLAN device supports 320 MHz bandwidth operations, and if so, further determines the one or more frequency segment compositions of the 320 MHz bandwidth supported by the WLAN device.

Figure 9:
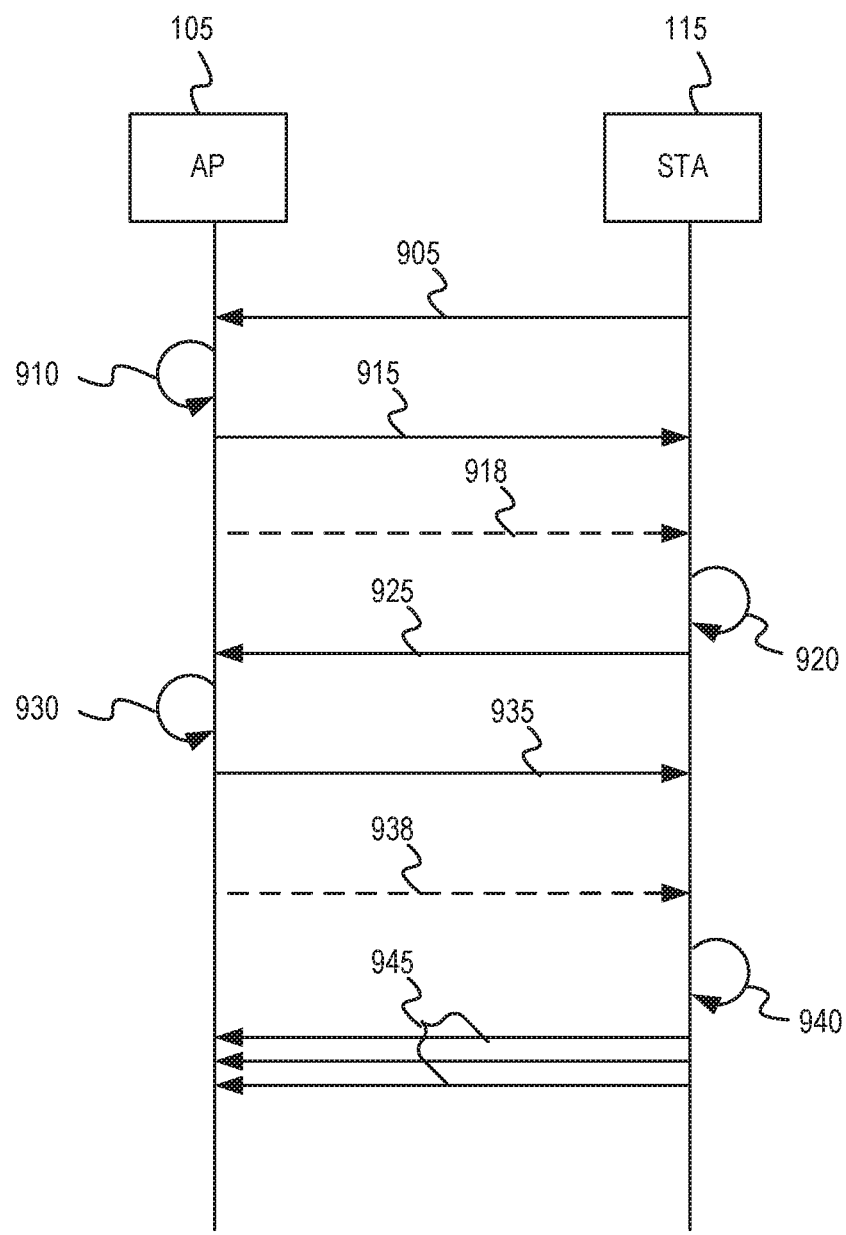
FIG. 9 depicts an example message flow diagram of EHT 320 MHz bandwidth signaling between an AP and a STA of a WLAN.

FIG. 9 depicts an example message flow diagram of EHT 320 MHz bandwidth signaling between an AP and a STA of a WLAN.

At 905, the STA 115 may perform active scanning in the WLAN by sending Probe Request Frames. The STA 115 may send Probe Request Frames to attempt to join a BSS associated with the AP 105. The STA 115 may include bandwidth capabilities information in the Probe Request Frames. For example, the STA 115 may include an EHT Capabilities IE that indicates the STA 115 supports a 320 MHz operating bandwidth, and indicates the one or more frequency segment compositions for the 320 MHz operating bandwidth that are supported by the STA 115.

At 910, the AP 105 may receive and process one of the Probe Request Frame sent by the STA 115. For example, the AP 105 may receive the Probe Request Frame that the STA 115 broadcasted in the operating channel of the AP 105. The AP 105 may process the EHT Capabilities IE received from the STA 115 to determine the bandwidth capabilities information associated with the STA 115, such as whether the STA 115 supports a 320 MHz operating bandwidth.

At 915, the AP 105 may send a Probe Response Frame to the STA 115. For example, the AP 105 may send a Probe Response Frame via the same channel (such as the AP's operating channel) that it received the Probe Request Frame. The Probe Response Frame may include the AP's bandwidth capabilities information. For example, the Probe Response Frame may include an EHT Capabilities IE that indicates the AP 105 supports the 320 MHz operating bandwidth, and indicates the one or more frequency segment compositions for the 320 MHz operating bandwidth that are supported by the AP 105.

At 918, the AP 105 also may periodically send a Beacon Frame to the devices in the WLAN every beacon interval. For example, the AP 105 may periodically broadcast a Beacon Frame via its operating channel to the WLAN. The Beacon Frame also may include the EHT Capabilities IE associated with the AP 105.

At 920, the STA 115 may receive and process the Probe Response Frame sent by the AP 105 at 915. For example, the STA 115 may process the EHT Capabilities IE received from the AP 105 to determine the bandwidth capabilities information associated with the AP 105, such as whether the AP 105 supports a 320 MHz operating bandwidth. After processing the Probe Response Frame (including the EHT Capabilities IE), the STA 115 may decide to move forward with the association process to join the BSS associated with the AP 105. In addition to the Probe Response Frame, the STA 115 also may receive and process the Beacon Frame.

At 925, the STA 115 may send an Association Request Frame to the AP 105 to initiate the association process. The STA 115 may include the EHT Capabilities IE in the Association Request Frame.

At 930, the AP 105 may receive and process the Association Request Frame sent by the STA 115. The AP 105 may determine whether additional bandwidth capabilities information (such as EHT Capabilities IEs) were received from additional STAs 115 of the WLAN. The AP 105 may determine the operating bandwidth and the frequency segment composition for the BSS based on the bandwidth capabilities information received from the STAs 115 of the WLAN. For example, if at least one STA 115 supports 320 MHz bandwidth operation, the AP 105 may set a 320 MHz operating bandwidth for the BSS. The AP 105 also may select one of the frequency segment compositions based on the bandwidth capabilities information received from the STAs 115. In some implementations, the AP 105 may set the highest operating bandwidth for the BSS that is supported by at least one of the STAs. For example, if none of the STAs 115 support a 320 MHz operating bandwidth, the AP 105 may determine the highest operating bandwidth supported by at least one of the STAs 115, such as a 160 MHz operating bandwidth.

At 935, the AP 105 sends an Association Response Frame to the STA 115 that sent the Association Request Frame. The AP 105 may include the operating bandwidth and frequency segment composition information in the Association Response Frame. For example, the AP 105 may include an EHT Operation IE in the Association Response Frame. The EHT Operation IE may indicate the 320 MHz operating bandwidth associated with the BSS, the frequency segment composition for the 320 MHz operating bandwidth, and the center frequency of each segment associated with the selected frequency segment composition. The AP 105 also processes additional information included in the Association Request Frame and determines to approve the association with the STA 115.

At 938, the AP 105 continues to periodically broadcast a Beacon Frame to the WLAN every beacon interval. The AP 105 also may include the EHT Operation IE in the Beacon Frame.

At 940, the STA 115 receives and processes the Association Response Frame sent by the AP 105. The STA 115 may determine that the EHT Operation IE indicates the 320 MHz operating bandwidth for the BSS, the selected frequency segment composition, and the center frequency of each segment associated with the selected frequency segment composition. The STA 115 also processes additional information included in the Association Response Frame to complete and acknowledge the association with the AP 105. In some implementations, the STA 115 may send an acknowledgement message to indicate to the AP 105 that the association has been completed and the STA 115 has joined the AP's BSS.

At 945, the STA 115 may send one or more packets to other WLAN devices that are part of the BSS. The packets may include an indication of the 320 MHz operating bandwidth. For example, the packet may indicate the 320 MHz operating bandwidth used by the STA 115 in an EHT signal field (such as the EHT SIG-A field). The EHT signal field (such as the EHT SIG-A field) may indicate the operating bandwidth (or channel width) of the packet. The EHT signal field may not indicate its frequency segment composition.

In some implementations, the STA 115 may change the channel width or operating bandwidth that it uses on a per-packet basis. The AP 105 may use the EHT Operation IE to set a maximum operating bandwidth for a BSS, such as a 320 MHz operating bandwidth. However, a STA 115 may vary the channel width or operating bandwidth on a per-packet basis, and therefore the STA 115 may not necessarily use the maximum operating bandwidth or channel width in every packet. The 320 MHz bandwidth signaling is on per-packet basis, however the frequency segment composition of the 320 MHz bandwidth (such as how many frequency segments are present in the 320 MHz bandwidth) is set for the BSS and indicated in an Operation Bandwidth Field of the EHT Operation IE, and therefore does not change on a per-packet basis.

Figure 10:
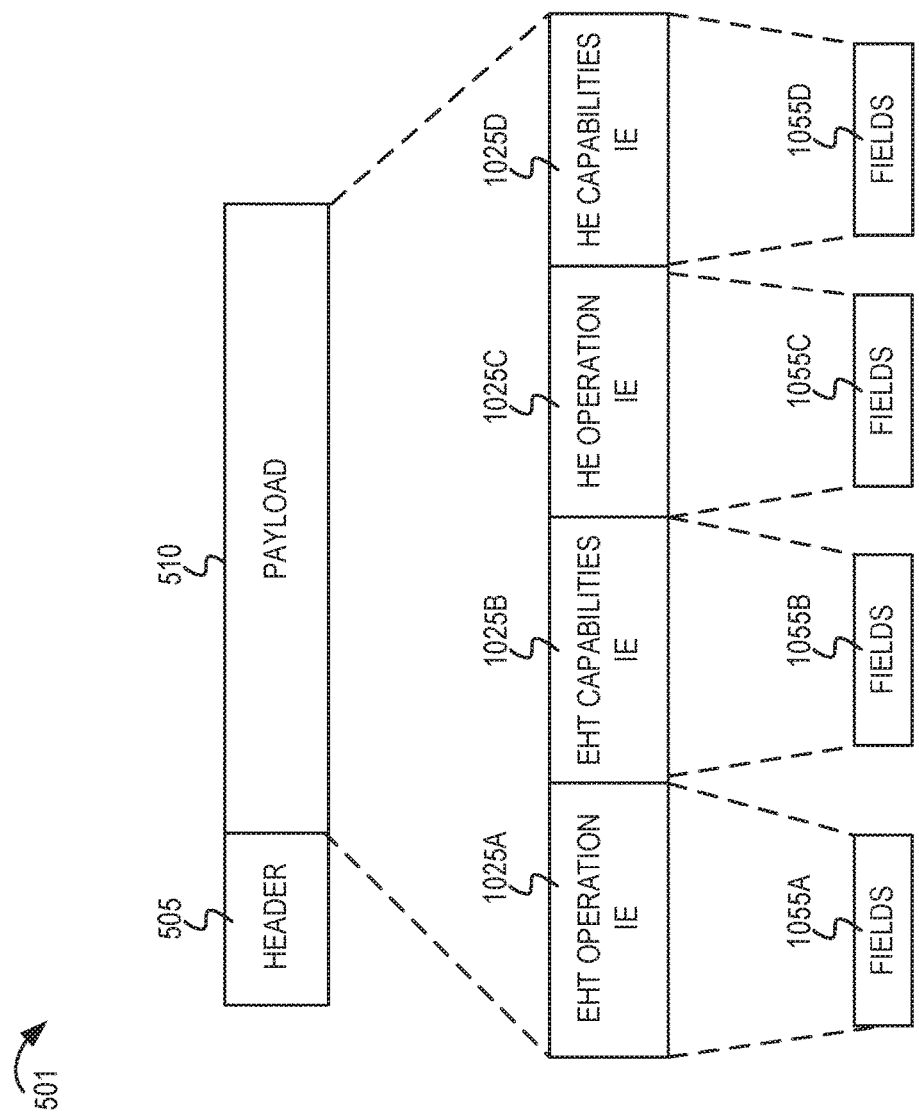
FIG. 10 depicts a conceptual diagram of an example management frame for EHT and non-EHT bandwidth signaling.

FIG. 10 depicts a conceptual diagram of an example management frame for EHT and non-EHT bandwidth signaling. As described in FIG. 5, the management frame 501 may include at least a header 505 and a payload 510. In some implementations, the header 505 may include a source network identifier, the length of data frame, or other frame control information. The payload 510 may include various Information Elements (IEs), such as an EHT Operation IE 1025A including fields 1055A, an EHT Capabilities IE 1025B including fields 1055B, a High Efficiency (HE) Operation IE 1025C including fields 1055C, and an HE Capabilities IE 1025D including fields 1055D. In some implementations, the payload 510 may include only the EHT Operation IE 1025A including fields 1055A and the HE Operation IE 1025C including fields 1055C. In some implementations, the payload 510 may include only the EHT Capabilities IE 1025B including fields 1055B and the HE Capabilities IE 1025D including fields 1055D.

In some implementations, the BSS may include both EHT and non-EHT devices. Non-EHT devices may be, for example, 802.11ax compliant or non-compliant devices (which also may be referred to as HE devices) that support a maximum operating bandwidth of 160 MHz (and therefore do not support a 320 MHz operating bandwidth). In some implementations, some EHT devices may not support a 320 MHz operating bandwidth, and instead support a maximum operating bandwidth of 160 MHz. If the BSS includes both EHT and non-EHT devices (or EHT devices that do not support a 320 MHz operating bandwidth), the AP may transmit at least two different Operation IEs in the management frame 501 to ensure compatibility with the various types of EHT and non-EHT devices. For example, the management frame 501 may include the EHT Operation IE 1025A (having the fields 1055A) and the HE Operation IE 1025C (having the fields 1055C). The EHT Operation IE 1025A (including the fields 1055A) may be directed to (and decoded by) EHT devices that support a 320 MHz operating bandwidth. The HE Operation IE 1025C (including the fields 1055C) may be directed to (and decoded by) non-EHT devices and also EHT devices that do not support a 320 MHz operating bandwidth. For example, the operating bandwidth information for EHT devices that do not support a 320 MHz operating bandwidth may be included in the HE Operation IE 1025C, and therefore these EHT devices may parse and decode both the EHT Operation IE 1025A and the HE Operation IE 1025C. In some implementations, during device discovery and during the exchange of bandwidth capabilities information, the management frame 501 may include only the EHT Capabilities IE 1025B (having fields 1055B) and the HE Capabilities IE 1025D (having fields 1055D). For example, an AP may send a management frame having both the EHT Capabilities IE 1025B (having fields 1055B) and the HE Capabilities IE 1025D (having fields 1055D) to advertise the AP's bandwidth capabilities to EHT devices that support a 320 MHz operating bandwidth, EHT devices that do not support a 320 MHz operating bandwidth, and non-EHT devices.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by an access point (AP), comprising:
   determining one or more stations (STAs) of a plurality of STAs of a basic service set (BSS) associated with the AP are Extremely High Throughput (EHT) devices that support a 320 MHz operating bandwidth, and one or more STAs of the plurality of STAs are High Efficiency (HE) devices that do not support the 320 MHz operating bandwidth;
   determining to advertise the 320 MHz operating bandwidth for to the plurality of STAs of the BSS;
   selecting a frequency segment composition for the 320 MHz operating bandwidth from a plurality of frequency segment compositions associated with the 320 MHz operating bandwidth; and
   outputting a management frame for transmission to at least one STA of the plurality of STAs, the management frame including:
      an EHT Operation Information Element (IE) for the EHT devices indicating the 320 MHz operating bandwidth associated with the BSS, the frequency segment composition for the 320 MHz operating bandwidth, and a center frequency of each segment associated with the frequency segment composition for the 320 MHz operating bandwidth, and
      an HE Operation IE for the HE devices indicating an operating bandwidth and a corresponding frequency segment composition.

2. The method of claim 1, further comprising:
   determining the center frequency of each segment associated with the frequency segment composition for the 320 MHz operating bandwidth.

3. The method of claim 1, wherein an Operation Bandwidth field of the EHT Operation IE further includes a primary channel number of a primary channel of the BSS, and a channel width for providing a composition of the 320 MHz operating bandwidth and a number of frequency segments.

4. The method of claim 1, wherein an Operation Bandwidth field of the EHT Operation IE further includes a first segment channel center frequency, a second segment channel center frequency, a third segment channel center frequency, and a fourth segment channel center frequency for indicating the center frequency of each segment associated with the frequency segment composition for the 320 MHz operating bandwidth.

5. The method of claim 1, further comprising:
   receiving bandwidth capabilities information from at least one of the plurality of STAs, the bandwidth capabilities information indicating support for the 320 MHz operating bandwidth and one or more frequency segment compositions from the plurality of frequency segment compositions associated with the 320 MHz operating bandwidth; and
   determining to advertise the 320 MHz operating bandwidth for the BSS in response to determining that the at least one of the plurality of STAs supports the 320 MHz operating bandwidth.

6. The method of claim 1, further comprising:
   receiving bandwidth capabilities information from one or more of the plurality of STAs, the bandwidth capabilities information indicating support for the 320 MHz operating bandwidth and one or more frequency segment compositions from the plurality of frequency segment compositions associated with the 320 MHz operating bandwidth; and
   selecting the frequency segment composition for the 320 MHz operating bandwidth from the plurality of frequency segment compositions associated with the 320 MHz operating bandwidth based, at least in part, on the one or more frequency segment compositions that are supported by the one or more of the plurality of STAs.

7. The method of claim 1, wherein the management frame is one of a Beacon Frame, a Probe Response Frame, or an Association Response Frame.

8. The method of claim 1, wherein the plurality of frequency segment compositions associated with the 320 MHz operating bandwidth include a single 320 MHz frequency segment, two 160 MHz frequency segments, four 80 MHz frequency segments, and one 160 MHz frequency segment and two 80 MHz frequency segments.

9. A method performed by an access point (AP), comprising:
obtaining an Extremely High Throughput (EHT) Capabilities Information Element (IE) from one or more stations (STAs) of a plurality of STAs of a basic service set (BSS) associated with the AP, the EHT Capabilities IE indicating the one or more STAs are EHT devices that supports a 320 MHz operating bandwidth;
obtaining a High Efficiency (HE) Capabilities IE from one or more STAs of the plurality of STAs, the HE Capabilities IE indicating the one or more STAs are HE devices that do not supports the 320 MHz operating bandwidth;
determining the AP supports the 320 MHz operating bandwidth;
selecting a frequency segment composition for the 320 MHz operating bandwidth from a plurality of frequency segment compositions associated with the 320 MHz operating bandwidth; and
outputting a management frame for transmission to at least one STA of the plurality of STAs, the management frame including:
an EHT Operation IE for the EHT devices indicating the 320 MHz operating bandwidth associated with the BSS, the frequency segment composition for the 320 MHz operating bandwidth, and a center frequency of each segment associated with the frequency segment composition for the 320 MHz operating bandwidth, and
an HE Operation IE for the HE devices indicating an operating bandwidth and a corresponding frequency segment composition.

10. The method of claim 9, further comprising:
determining the center frequency of each segment associated with the frequency segment composition for the 320 MHz operating bandwidth.

11. The method of claim 9, further comprising:
receiving, from one of the plurality of STAs, a packet in a channel of the BSS using the 320 MHz operating bandwidth and the frequency segment composition, the packet including an indication of the 320 MHz operating bandwidth.

12. The method of claim 11, wherein an Operation Bandwidth field of the EHT Operation IE includes a primary channel number of a primary channel of the BSS, a channel width for providing the frequency segment composition of the 320 MHz operating bandwidth, and the center frequency of each segment associated with the frequency segment composition for the 320 MHz operating bandwidth.

13. The method of claim 9, wherein the EHT Capabilities IE further indicates one or more frequency segment compositions associated with the 320 MHz operating bandwidth that are supported by the EHT devices.

14. The method of claim 9, wherein the management frame is one of a Beacon Frame, a Probe Response Frame, or an Association Response Frame.

15. The method of claim 9, wherein the plurality of frequency segment compositions associated with the 320 MHz operating bandwidth include a single 320 MHz frequency segment, two 160 MHz frequency segments, four 80 MHz frequency segments, and one 160 MHz frequency segment and two 80 MHz frequency segments.

16. An access point (AP), comprising:
a processor; and
memory having instructions stored therein which, when executed by the processor, cause the AP to:
determine one or more stations (STAs) of a plurality of STAs of a basic service set (BSS) associated with the AP are Extremely High Throughput (EHT) devices that support a 320 MHz operating bandwidth, and one or more STAs of the plurality of STAs are High Efficiency (HE) devices that do not support the 320 MHz operating bandwidth;
determine to advertise the 320 MHz operating bandwidth to the plurality of STAs of the BSS;
select a frequency segment composition for the 320 MHz operating bandwidth from a plurality of frequency segment compositions associated with the 320 MHz operating bandwidth; and
output a management frame for transmission to at least one STA of the plurality of STAs, the management frame including:
an EHT Operation Information Element (IE) for the EHT devices indicating the 320 MHz operating bandwidth associated with the BSS, the frequency segment composition for the 320 MHz operating bandwidth, and a center frequency of each segment associated with the frequency segment composition for the 320 MHz operating bandwidth, and
an HE Operation IE for the HE devices indicating an operating bandwidth and a corresponding frequency segment composition.

17. The AP of claim 16, wherein the instructions, when executed by the processor, further cause the AP to:
determine the center frequency of each segment associated with the frequency segment composition for the 320 MHz operating bandwidth.

18. The AP of claim 16, wherein an Operation Bandwidth field of the EHT Operation IE further includes:
a primary channel number of a primary channel of the BSS,
a channel width for providing a composition of the 320 MHz operating bandwidth and a number of frequency segments; and
a first segment channel center frequency, a second segment channel center frequency, a third segment channel center frequency, and a fourth segment channel center frequency for indicating the center frequency of each segment associated with the frequency segment composition for the 320 MHz operating bandwidth.

19. The AP of claim 16, wherein the instructions, when executed by the processor, further cause the AP to:
receive bandwidth capabilities information from at least one of the plurality of STAs, the bandwidth capabilities information indicating support for the 320 MHz operating bandwidth and one or more frequency segment compositions from the plurality of frequency segment compositions associated with the 320 MHz operating bandwidth; and
determine to advertise the 320 MHz operating bandwidth for the BSS in response to a determination that the at least one of the plurality of STAs supports the 320 MHz operating bandwidth.

20. The AP of claim 16, wherein the plurality of frequency segment compositions associated with the 320 MHz operating bandwidth include a single 320 MHz frequency segment, two 160 MHz frequency segments, four 80 MHz frequency segments, and one 160 MHz frequency segment and two 80 MHz frequency segments.

21. A non-transitory computer-readable storage medium having instructions stored therein, which when executed by a processor of an access point (AP), cause the AP to:

determine one or more stations (STAs) of a plurality of STAs of a basic service set (BSS) associated with the AP are Extremely High Throughput (EHT) devices that support a 320 MHz operating bandwidth, and one or more STAs of the plurality of STAs are High Efficiency (HE) devices that do not support the 320 MHz operating bandwidth;

determine to advertise the 320 MHz operating bandwidth to the plurality of STAs of the BSS;

select a frequency segment composition for the 320 MHz operating bandwidth from a plurality of frequency segment compositions associated with the 320 MHz operating bandwidth; and output a management frame for transmission to at least one STA of the plurality of STAs, the management frame including:
- an EHT Operation Information Element (IE) for the EHT devices indicating the 320 MHz operating bandwidth associated with the BSS, the frequency segment composition for the 320 MHz operating bandwidth, and a center frequency of each segment associated with the frequency segment composition for the 320 MHz operating bandwidth, and
- an HE Operation IE for the HE devices indicating an operating bandwidth and a corresponding frequency segment composition.

22. The non-transitory computer-readable storage medium of claim 21, wherein the instructions, when executed by the processor, further cause the AP to:
determine the center frequency of each segment associated with the frequency segment composition for the 320 MHz operating bandwidth.

23. The non-transitory computer-readable storage medium of claim 21, wherein the instructions, when executed by the processor, further cause the AP to:
receive bandwidth capabilities information from at least one of the plurality of STAs, the bandwidth capabilities information indicating support for the 320 MHz operating bandwidth and one or more frequency segment compositions from the plurality of frequency segment compositions associated with the 320 MHz operating bandwidth; and
determine to advertise the 320 MHz operating bandwidth for the BSS in response to a determination that the at least one of the plurality of STAs supports the 320 MHz operating bandwidth.

* * * * *